United States Patent
Zhang et al.

(10) Patent No.: US 12,538,241 B2
(45) Date of Patent: Jan. 27, 2026

(54) COMMUNICATION BASED ON RESPONSE TO POWER ADJUSTMENT RECOMMENDATION OR FEEDBACK RULE

(71) Applicant: QUALCOMM Incorporated, San Diego, CA (US)

(72) Inventors: Qian Zhang, Basking Ridge, NJ (US); Muhammad Sayed Khairy Abdelghaffar, San Jose, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 18/355,353

(22) Filed: Jul. 19, 2023

(65) Prior Publication Data

US 2025/0031154 A1    Jan. 23, 2025

(51) Int. Cl.
*H04W 52/24* (2009.01)
*H04W 52/14* (2009.01)
*H04W 72/1268* (2023.01)

(52) U.S. Cl.
CPC ....... *H04W 52/243* (2013.01); *H04W 52/143* (2013.01); *H04W 72/1268* (2013.01)

(58) Field of Classification Search
CPC ... H04W 52/24; H04W 52/243; H04W 52/14; H04W 52/52143; H04W 72/1268
See application file for complete search history.

(56) References Cited

U.S. PATENT DOCUMENTS

| | | | |
|---|---|---|---|
| 12,261,800 B2 * | 3/2025 | Zhang | H04L 5/0053 |
| 12,289,615 B2 * | 4/2025 | Jöngren | H04W 56/001 |
| 12,363,577 B2 * | 7/2025 | Zhang | H04B 17/345 |
| 12,369,063 B2 * | 7/2025 | Zhang | H04L 5/0092 |
| 12,388,604 B2 * | 8/2025 | Zhang | H04W 24/10 |
| 2023/0055304 A1 * | 2/2023 | Shim | H04W 72/541 |
| 2023/0291529 A1 * | 9/2023 | Zhang | H04L 5/006 |
| 2023/0318785 A1 * | 10/2023 | Zhang | H04L 5/0091 |
| 2023/0370233 A1 * | 11/2023 | Zhang | H04B 7/0408 |
| 2024/0014977 A1 * | 1/2024 | Zhang | H04W 24/10 |
| 2024/0137872 A1 * | 4/2024 | Abotabl | H04W 52/143 |
| 2024/0147279 A1 * | 5/2024 | Zhang | H04W 24/10 |
| 2024/0205712 A1 * | 6/2024 | Zhang | H04L 5/0051 |
| 2024/0214943 A1 * | 6/2024 | Rudolf | H04W 52/146 |
| 2024/0267765 A1 * | 8/2024 | Zhang | H04B 17/345 |
| 2024/0276279 A1 * | 8/2024 | Haustein | H04W 24/10 |

(Continued)

FOREIGN PATENT DOCUMENTS

WO    WO-2023052623 A1 *    4/2023    ............ H04W 52/42

*Primary Examiner* — Hai V Nguyen
(74) *Attorney, Agent, or Firm* — Harrity & Harrity LLP/Qualcomm Incorporated

(57) ABSTRACT

Various aspects of the present disclosure generally relate to wireless communication. In some aspects, a first network entity may receive measurement reference signals from a second network entity. The first network entity may measure cross-link interference (CLI) based at least in part on the measurement reference signals. The first network entity may transmit a recommendation for downlink transmit power adjustment of the second network entity, based at least in part on the CLI. The first network entity may communicate based at least in part on a response to the recommendation or a feedback rule for the recommendation. Numerous other aspects are described.

35 Claims, 14 Drawing Sheets

(56) References Cited

U.S. PATENT DOCUMENTS

| | | | | |
|---|---|---|---|---|
| 2024/0373271 A1* | 11/2024 | Zhang | ................... | H04B 17/336 |
| 2025/0024456 A1* | 1/2025 | Zhang | ................... | H04L 5/0096 |
| 2025/0081023 A1* | 3/2025 | Liu | ..................... | H04W 24/10 |

* cited by examiner

COMMUNICATION BASED ON RESPONSE TO POWER ADJUSTMENT RECOMMENDATION OR FEEDBACK RULE

FIELD OF THE DISCLOSURE

Aspects of the present disclosure generally relate to wireless communication and specifically to techniques and apparatuses for communicating based on a response to a power adjustment recommendation or a feedback rule.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first network entity. The method may include receiving measurement reference signals from a second network entity. The method may include measuring inter-network-entity cross-link interference (CLI) based at least in part on the measurement reference signals. The method may include transmitting a recommendation for downlink transmit power adjustment of the second network entity, based at least in part on the inter-network-entity CLI. The method may include communicating based at least in part on a response to the recommendation or a feedback rule for the recommendation.

Some aspects described herein relate to a method of wireless communication performed by a second network entity. The method may include transmitting measurement reference signals to a first network entity. The method may include receiving, from the first network entity, a recommendation for downlink transmit power adjustment of the second network entity. The method may include transmitting, to the first network entity, a response that is based at least in part on the recommendation.

Some aspects described herein relate to a method of wireless communication performed by a third network entity. The method may include selecting one or more parameters to be used by a second network entity for responding to a recommendation from a first network entity for downlink transmit power adjustment of the second network entity. The method may include transmitting, to the second network entity, an indication of the one or more parameters.

Some aspects described herein relate to a first network entity for wireless communication. The first network entity may include one or more memories and one or more processors coupled to the one or more memories. The one or more processors may be individually or collectively configured to receive measurement reference signals from a second network entity. The one or more processors may be individually or collectively configured to measure inter-network-entity CLI based at least in part on the measurement reference signals. The one or more processors may be individually or collectively configured to transmit a recommendation for downlink transmit power adjustment of the second network entity, based at least in part on the inter-network-entity CLI. The one or more processors may be individually or collectively configured to communicate based at least in part on a response to the recommendation or a feedback rule for the recommendation.

Some aspects described herein relate to a second network entity for wireless communication. The second network entity may include one or more memories and one or more processors coupled to the one or more memories. The one or more processors may be individually or collectively configured to transmit measurement reference signals to a first network entity. The one or more processors may be individually or collectively configured to receive, from the first network entity, a recommendation for downlink transmit power adjustment of the second network entity. The one or more processors may be individually or collectively configured to transmit, to the first network entity, a response that is based at least in part on the recommendation.

Some aspects described herein relate to a third network entity for wireless communication. The third network entity may include one or more memories and one or more processors coupled to the one or more memories. The one or more processors may be individually or collectively configured to select one or more parameters to be used by a second network entity for responding to a recommendation from a first network entity for downlink transmit power adjustment of the second network entity. The one or more processors may be individually or collectively configured to transmit, to the second network entity, an indication of the one or more parameters.

Some aspects described herein relate to a non-transitory computer-readable medium that stores a set of instructions for wireless communication by a first network entity. The set of instructions, when executed by one or more processors of the first network entity, may cause the first network entity to receive measurement reference signals from a second network entity. The set of instructions, when executed by one or more processors of the first network entity, may cause the first network entity to measure inter-network-entity CLI based at least in part on the measurement reference signals. The set of instructions, when executed by one or more processors of the first network entity, may cause the first network entity to transmit a recommendation for downlink transmit power adjustment of the second network entity, based at least in part on the inter-network-entity CLI. The set of instructions, when executed by one or more processors of the first network entity, may cause the first network entity to communicate based at least in part on a response to the recommendation or a feedback rule for the recommendation.

Some aspects described herein relate to a non-transitory computer-readable medium that stores a set of instructions for wireless communication by a second network entity. The set of instructions, when executed by one or more processors of the second network entity, may cause the second network entity to transmit measurement reference signals to a first network entity. The set of instructions, when executed by one or more processors of the second network entity, may cause the second network entity to receive, from the first network entity, a recommendation for downlink transmit power adjustment of the second network entity. The set of instructions, when executed by one or more processors of the second network entity, may cause the second network entity to transmit, to the first network entity, a response that is based at least in part on the recommendation.

Some aspects described herein relate to a non-transitory computer-readable medium that stores a set of instructions for wireless communication by a third network entity. The set of instructions, when executed by one or more processors of the third network entity, may cause the third network entity to select one or more parameters to be used by a second network entity for responding to a recommendation from a first network entity for downlink transmit power adjustment of the second network entity. The set of instructions, when executed by one or more processors of the third network entity, may cause the third network entity to transmit, to the second network entity, an indication of the one or more parameters.

Some aspects described herein relate to a first apparatus for wireless communication. The first apparatus may include one or more memories and one or more processors coupled to the one or more memories. The first apparatus may include means for receiving measurement reference signals from a second apparatus. The first apparatus may include means for measuring inter-network-entity CLI based at least in part on the measurement reference signals. The first apparatus may include means for transmitting a recommendation for downlink transmit power adjustment of the second apparatus, based at least in part on the inter-network-entity CLI. The first apparatus may include means for communicating based at least in part on a response to the recommendation or a feedback rule for the recommendation.

Some aspects described herein relate to a second apparatus for wireless communication. The second apparatus may include one or more memories and one or more processors coupled to the one or more memories. The second apparatus may include means for transmitting measurement reference signals to a first apparatus. The second apparatus may include means for receiving, from the first apparatus, a recommendation for downlink transmit power adjustment of the second apparatus. The second apparatus may include means for transmitting, to the first apparatus, a response that is based at least in part on the recommendation.

Some aspects described herein relate to a third apparatus for wireless communication. The third apparatus may include one or more memories and one or more processors coupled to the one or more memories. The third apparatus may include means for selecting one or more parameters to be used by a second apparatus for responding to a recommendation from a first apparatus for downlink transmit power adjustment of the second apparatus. The third apparatus may include means for transmitting, to the second apparatus, an indication of the one or more parameters.

Aspects generally include a method, apparatus, system, computer program product, non-transitory computer-readable medium, UE, base station, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
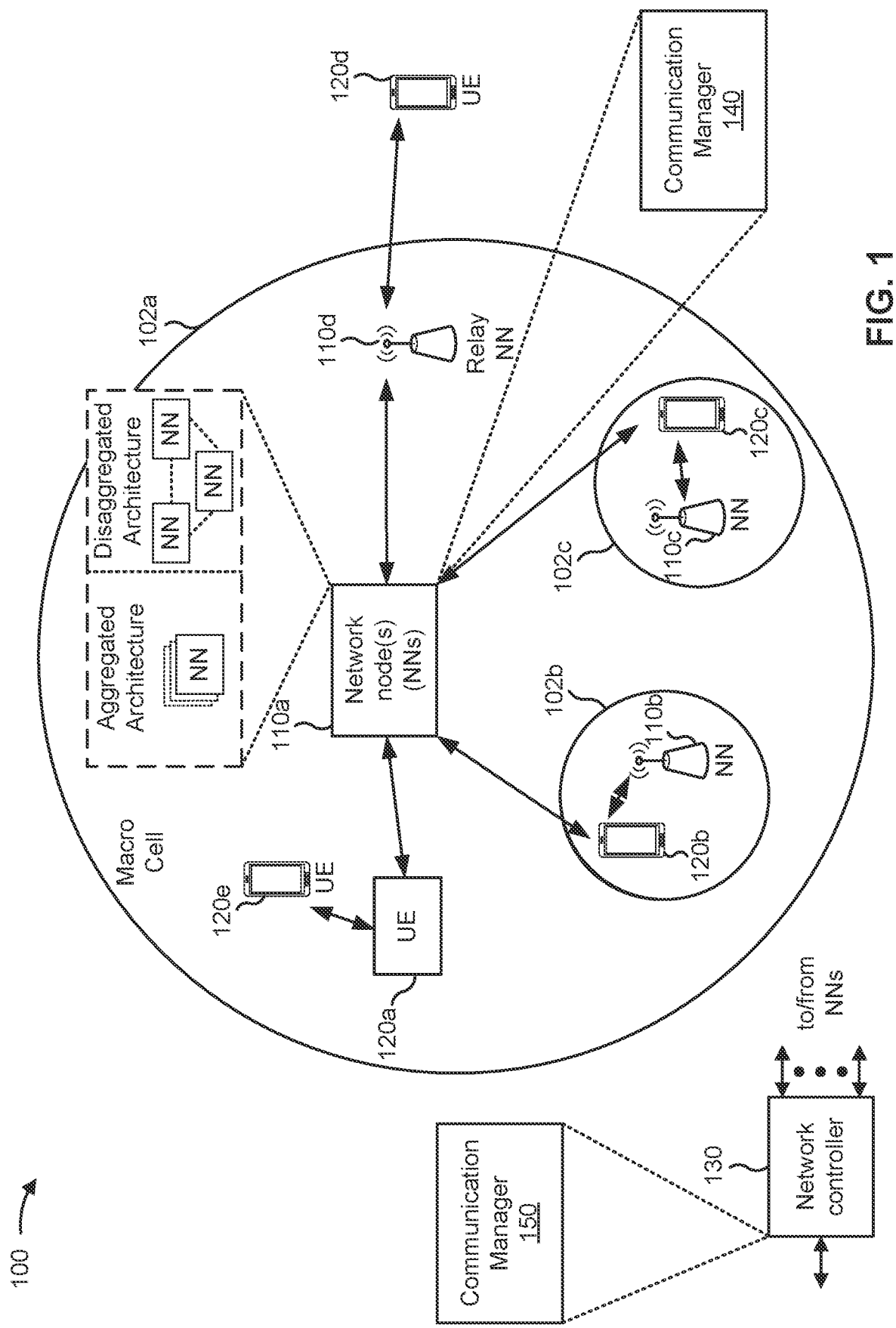
FIG. 1 is a diagram illustrating an example of a wireless network, in accordance with the present disclosure.

Various aspects relate generally to wireless communication and more particularly to full duplex (FD) transmissions. Some aspects more specifically relate to a user equipment (UE) operating in an in-band FD mode. In the in-band full duplex mode, the UE may transmit and receive on a same time and frequency resource. An uplink and a downlink may share the same time and frequency resource. Full duplex operations may include a subband full duplex (SBFD) mode. The SBFD mode may also be referred to as a subband frequency division duplex mode or a flexible duplex mode. The wireless communication device may transmit and receive at a same time (in the same SBFD symbol or slot), but the wireless communication device may transmit and receive on different frequency domain resources.

In some scenarios in communications between network entities (e.g., gNBs), a first gNB (victim gNB) may experience some inter-gNB cross-link interference (CLI) from a second gNB (aggressor gNB). CLI is interference that is caused by different link directions on the same frequency band in the same cell or neighboring cells. The greater the transmit power used by the second gNB, the greater the CLI. CLI may degrade communications. Failed communications and retransmissions waste signaling resources and increase latency.

According to various aspects described herein, a first network entity may measure CLI and provide a recommendation to a second network entity to adjust a transmit power. The recommendation may include a power backoff amount (e.g., 5 decibels (dB)) or another indication of how much the transmit power is to be reduced. The recommendation may include a transmit power value. The first network entity may receive a response that the recommendation was accepted (e.g., acknowledgment (ACK)) or not accepted (e.g., negative ACK (NACK)). The first network entity may communicate based at least in part on the response. For example, if the response is an ACK (e.g., confirmation message), the first network entity may communicate as normal without expecting as much CLI (since the second network entity is expected to reduce transmit power). If the response is a NACK (e.g., negative response), the first network entity may communicate differently. This may include making a scheduling change to not receive from a first UE when the second network entity is transmitting to a second UE in a direction of the first UE. In some aspects, the first network entity may communicate based at least in part on a feedback rule for when a response is not received. The default value may be an ACK or a NACK if no response is received.

Particular aspects of the subject matter described in this disclosure can be implemented to realize one or more of the following potential advantages. In some examples, by communicating based at least in part on a response to, or a feedback rule for, a transmit power adjustment recommendation, the first network entity may mitigate or avoid CLI from the second network entity and improve communications. Improving communications conserves signaling resources and reduces latency.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 May communicate with one another directly or indirectly via a wireless or wireline backhaul communication link. In some aspects, the network controller 130 may be a CU or a core network device, or may include a CU or a core network device. The network controller 130 may include a central unit that provides parameters associated with responding to power adjustment recommendations.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and May operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHZ-7.125 GHZ) and FR2 (24.25 GHZ-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a. FR4-1, and/or FR5) may be modified, and techniques described herein are applicable to those modified frequency ranges.

In some aspects, a first network entity (e.g., a network node 110) may include a communication manager 140. As described in more detail elsewhere herein, the communication manager 140 may receive measurement reference signals from a second network entity. The communication manager 140 may measure inter-network-entity CLI based at least in part on the measurement reference signals. The communication manager 140 may transmit a recommendation for downlink transmit power adjustment of the second network entity, based at least in part on the inter-network-entity CLI. The communication manager 140 may communicate based at least in part on a response to the recommendation or a feedback rule for the recommendation.

In some aspects, a second network entity (e.g., a network node 110) may include a communication manager 140. As described in more detail elsewhere herein, the communication manager 140 may transmit measurement reference signals to a first network entity; receive, from the first network entity, a recommendation for downlink transmit power adjustment of the second network entity. The communication manager 140 may transmit, to the first network entity, a response that is based at least in part on the recommendation.

In some aspects, a third network entity (e.g., a network node 110, a network controller 130) may include a communication manager 140. As described in more detail elsewhere herein, the communication manager 140 may select one or more parameters to be used by a second network entity for responding to a recommendation from a first network entity for downlink transmit power adjustment of the second network entity. The communication manager 140 may transmit, to the second network entity, an indication of the one or more parameters. Additionally, or alternatively, the communication manager 140 may perform one or more other operations described herein.

As indicated above, FIG. 1 is provided as an example. Other examples may differ from what is described with regard to FIG. 1.

Figure 2:
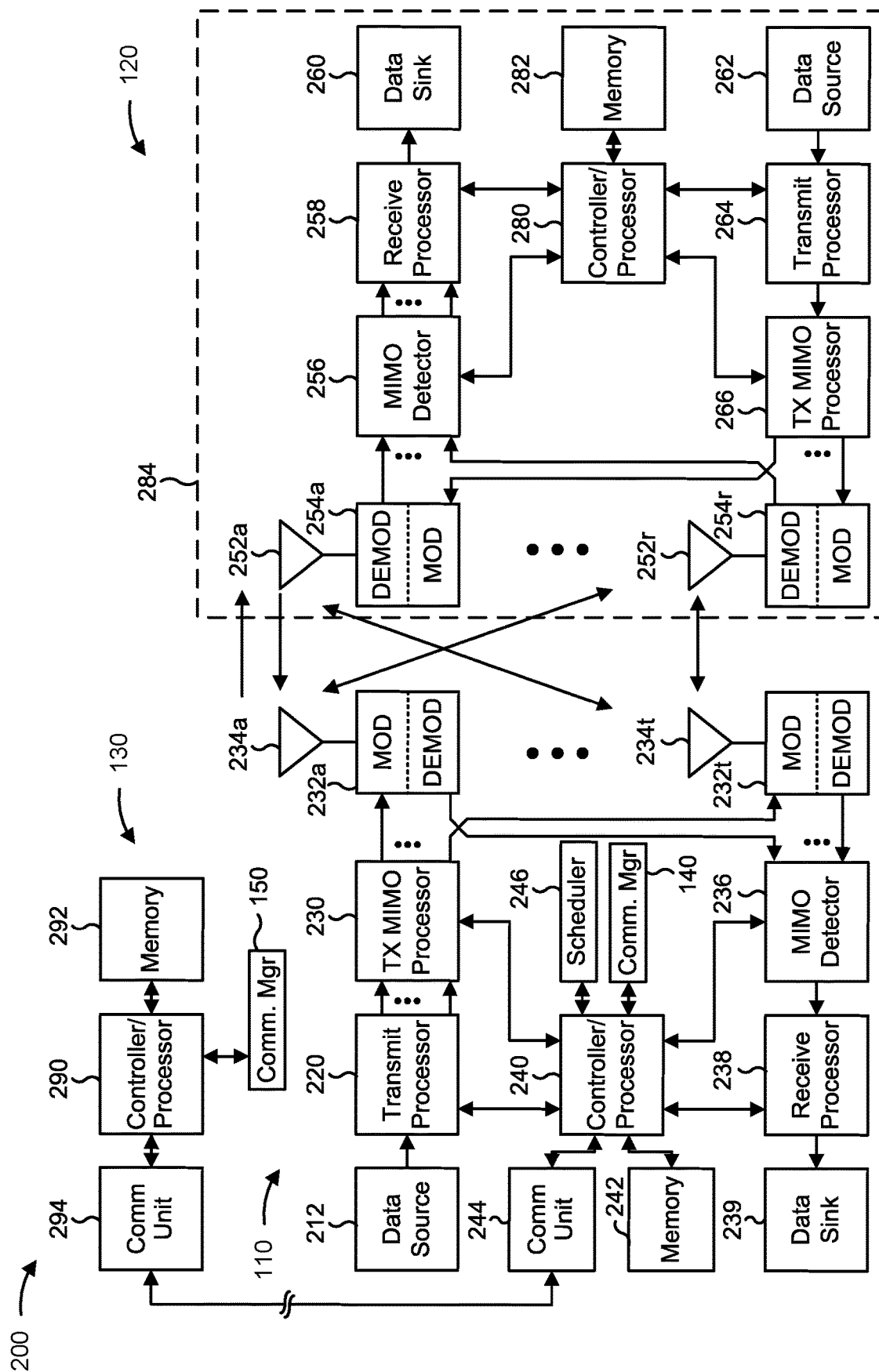
FIG. 2 is a diagram illustrating an example base station in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-14).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-14).

The controller/processor of a network entity (e.g., controller/processor 240 of the network node 110), the controller/processor 280 of the UE 120, or any other component(s) of FIG. 2 may perform one or more techniques associated with communicating based on a response to, or a feedback rule for, a power adjustment recommendation, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, process 1200 of FIG. 12, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, a first network entity (e.g., a network node 110) includes means for receiving measurement reference signals from a second network entity (e.g., using antenna 234, modem 232, MIMO detector 236, receive processor 238, controller/processor 240, memory 242, and/or the like); means for measuring inter-network-entity CLI based at least in part on the measurement reference signals (e.g., using antenna 234, modem 232, MIMO detector 236, receive processor 238, controller/processor 240, memory 242, and/or the like); means for transmitting a recommendation for downlink transmit power adjustment of the second network entity, based at least in part on the inter-network-entity CLI (e.g., using controller/processor 240, transmit processor 220, TX MIMO processor 230, modem 232, antenna 234, memory 242, and/or the like); and/or means for communicating based at least in part on a response to the recommendation or a feedback rule for the recommendation (e.g., using antenna 234, modem 232, MIMO detector 236, receive processor 238, transmit processor 220, TX MIMO processor 230, controller/processor 240, memory 242, and/or the like). In some aspects, the means for the first network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a second network entity (e.g., a network node 1100) includes means for transmitting measurement reference signals to a first network entity (e.g., using controller/processor 240, transmit processor 220, TX MIMO processor 230, modem 232, antenna 234, memory 242, and/or the like); means for receiving, from the first network entity, a recommendation for downlink transmit power adjustment of the second network entity (e.g., using antenna 234, modem 232, MIMO detector 236, receive processor 238, controller/processor 240, memory 242, and/or the like); and/or means for transmitting, to the first network entity, a response that is based at least in part on the recommendation (e.g., using controller/processor 240, transmit processor 220, TX MIMO processor 230, modem 232, antenna 234, memory 242, and/or the like). In some aspects, the means for the second network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a third network entity (e.g., a network node 110, a network controller 130) includes means for selecting one or more parameters to be used by a second network entity for responding to a recommendation from a first network entity for downlink transmit power adjustment of the second network entity (e.g., using controller/processor 240, memory 242, and/or the like); and/or means for transmitting, to the second network entity, an indication of the one or more parameters (e.g., using controller/processor 240, transmit processor 220, TX MIMO processor 230, modem 232, antenna 234, memory 242, and/or the like). In some aspects, the means for the third network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
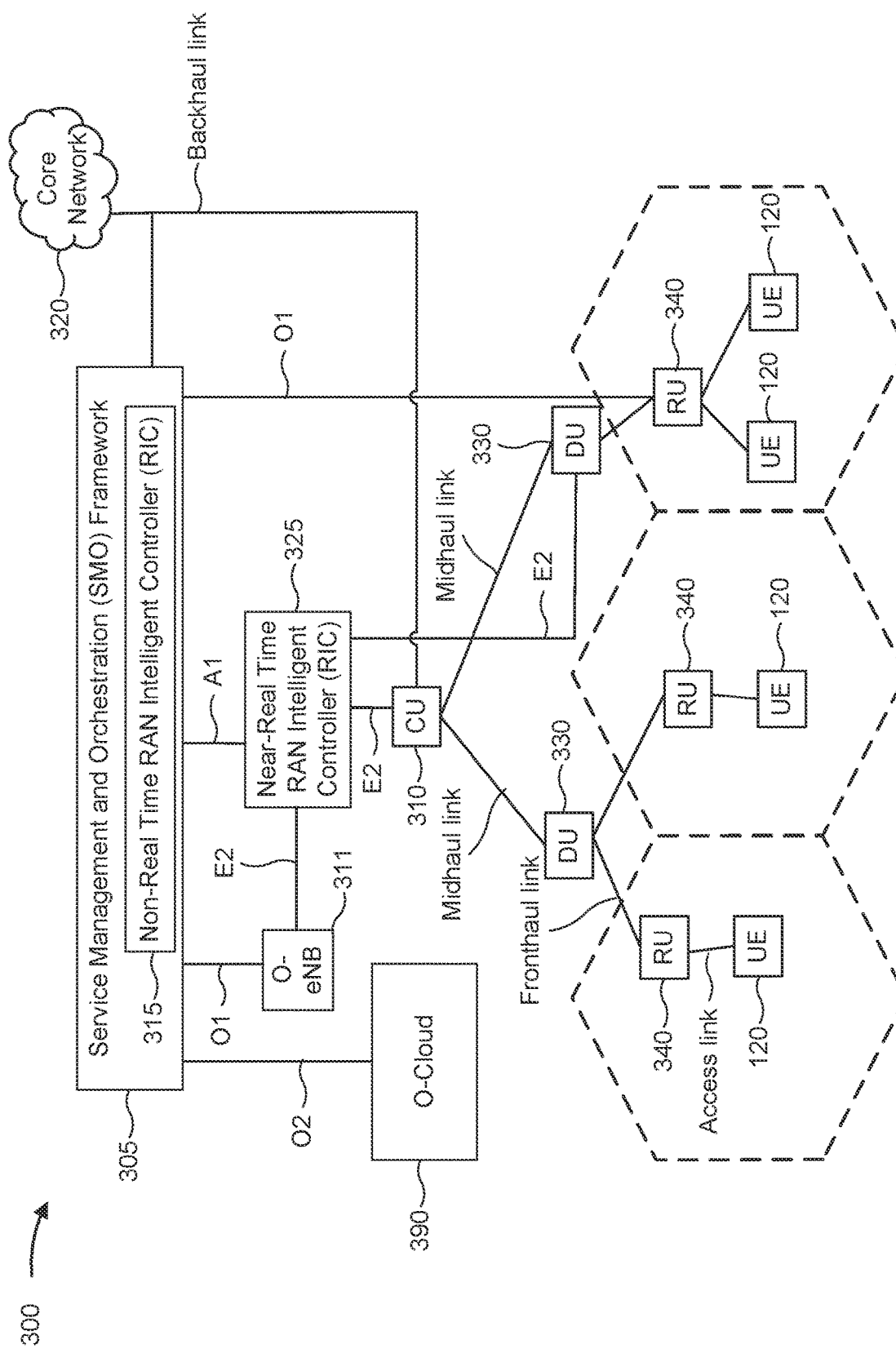
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (e.g., Central Unit-User Plane (CU-UP) functionality), control plane functionality (e.g., Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which may also be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based at least in part on a functional split (e.g., a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open CNB (O-CNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
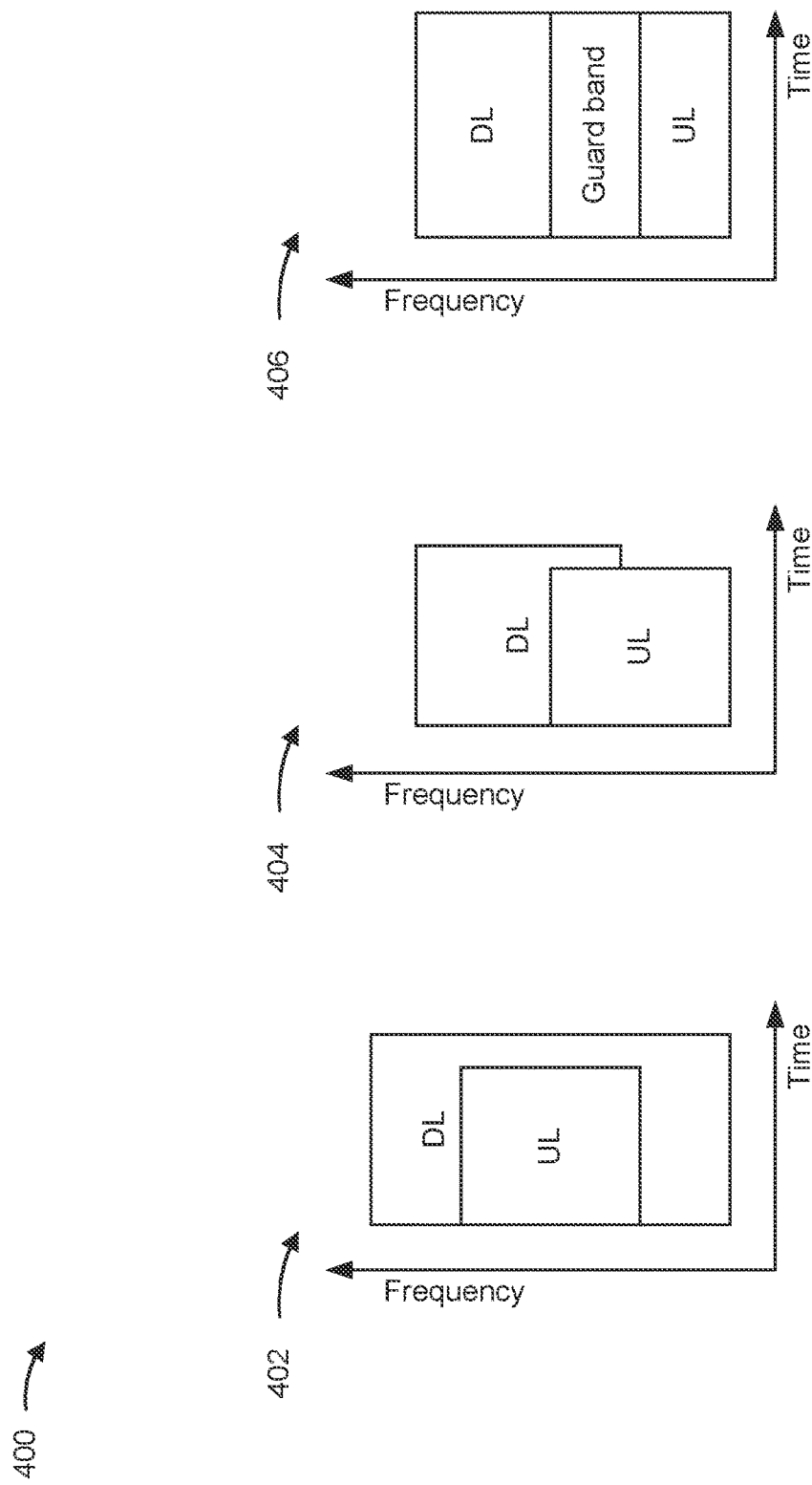
FIG. 4 is a diagram illustrating examples of full duplex communication, in accordance with the present disclosure.

FIG. 4 is a diagram illustrating examples of full duplex communication 400, in accordance with the present disclosure. In some cases, a wireless communication device (such as a UE or a network entity) may support full duplex operations. Full duplex operations may include the wireless communication device transmitting and receiving at approximately the same time.

A UE may operate in an in-band FD mode. In the in-band full duplex mode, the UE may transmit and receive on a same time and frequency resource. An uplink and a downlink may share the same time and frequency resource. For example, in a first full duplex communication 402, a time and frequency resource for the uplink may fully overlap with a time and frequency resource for the downlink. As another example, in a second full duplex communication 404, a time and frequency resource for the uplink may partially overlap with a time and frequency resource for the downlink.

Full duplex operations may include SBFD mode. The SBFD mode may also be referred to as a subband frequency division duplex mode or a flexible duplex mode. SBFD communication 406 shows that the wireless communication device may transmit and receive at a same time (in the same SBFD slot), but the wireless communication device may transmit and receive on different frequency domain resources. For example, a network entity may be operating in an SBFD mode. The network entity may schedule a first UE to receive a downlink communication in an SBFD slot. The network entity may schedule a second UE to transmit an uplink communication in the same SBFD slot. However, the uplink communication may cause interference for the first UE that is receiving the downlink communication. To address this, a downlink time/frequency resource in the SBFD slot may be separated (e.g., in time or frequency) from an uplink time/frequency resource in the SBFD slot by a gap, which may function to reduce self-interference and improve latency and uplink coverage. The gap may be a frequency offset or a frequency gap (guard band) between downlink time/frequency resources and uplink time/frequency resources in the same SBFD slot.

Uplink transmissions within an uplink subband may be allowed in the symbol. Uplink transmissions outside an uplink subband may not be allowed in the symbol. Frequency locations of downlink subband(s) may be known to an SBFD-aware UE. The frequency location of downlink subband(s) may be explicitly indicated or implicitly derived. Downlink receptions within downlink subband(s) may be allowed in the symbol. Uplink transmissions may be within an active uplink bandwidth part (BWP) and downlink receptions may be within an active downlink BWP in the symbol.

Full duplex and SBFD may increase the uplink duty cycle, which reduces latency and improves coverage. SBFD may enhance system capacity, resource utilization, and spectrum efficiency. SBFD may enable flexible and dynamic uplink/downlink resource adaption of traffic in a robust manner.

As indicated above, FIG. 4 is provided as an example. Other examples may differ from what is described with regard to FIG. 4.

Figure 5:
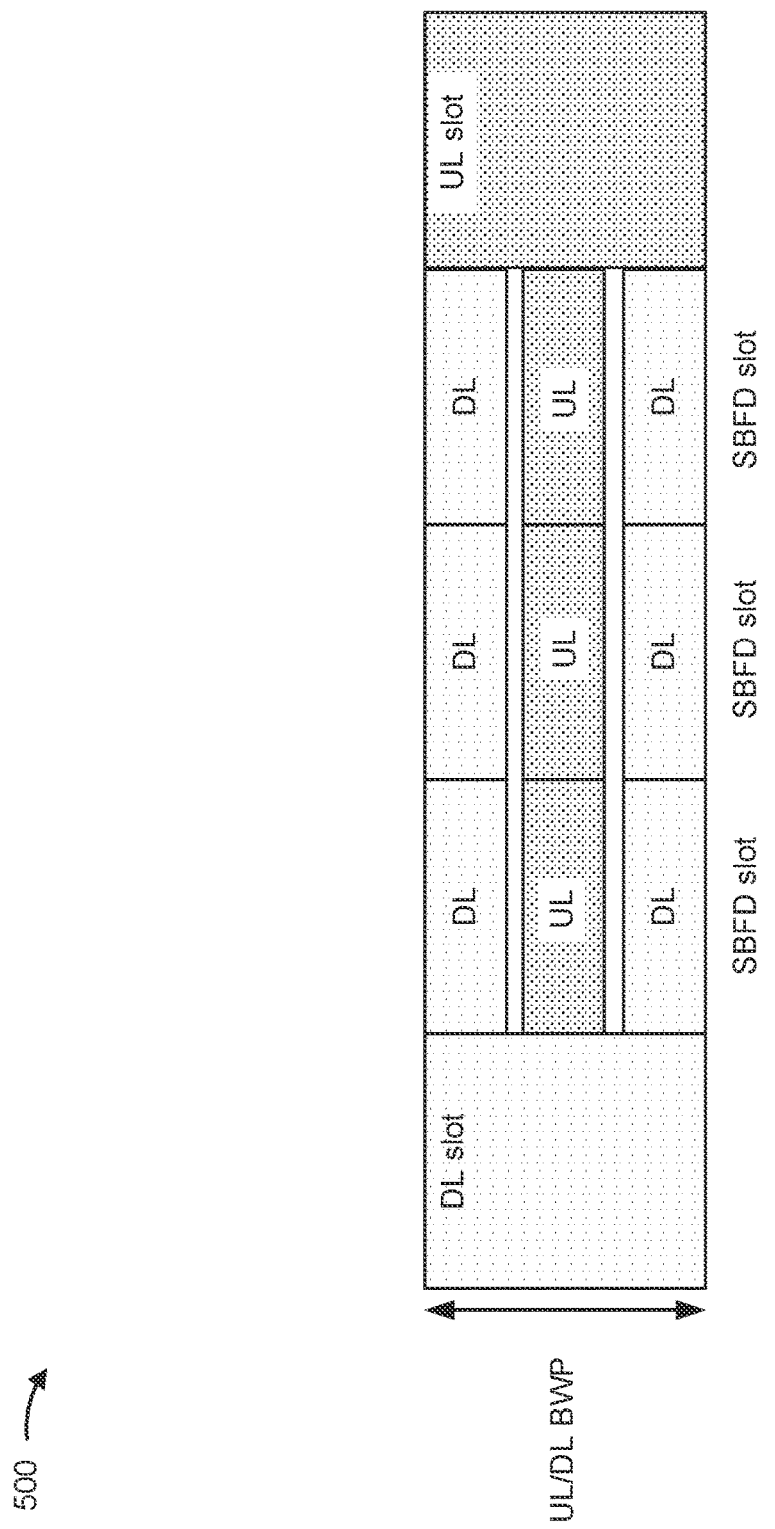
FIG. 5 is a diagram illustrating an example of a slot pattern with subband full duplex (SBFD) slots, in accordance with the present disclosure.

FIG. 5 is a diagram illustrating an example 500 of a slot pattern with SBFD slots, in accordance with the present disclosure.

A UE may transmit or receive communications using a configured symbol or slot pattern in time division duplexing (TDD) communication. The configured symbol or slot pattern may include a combination of downlink symbols or slots, uplink symbols or slots, or SBFD symbols or slots within a BWP for UL and DL. Example 500 shows SBFD slots (SBFD symbols in SBFD slots) that may be used for operation in an RRC connected state, where the UE maintains a connection that is established with RRC signaling. In some examples, the UE may be an SBFD-aware UE, where the time and frequency locations of subbands for SBFD operation are known to the SBFD-aware UE. In some examples, the UE may receive a semi-static time and frequency SBFD configuration for a symbol or slot pattern. The symbol or slot pattern may repeat. The UE may receive the configuration via RRC signaling. The configuration may be semi-static in that the UE maintains the configuration for communications until the UE receives an updated configuration.

As indicated above, FIG. 5 is provided as an example. Other examples may differ from what is described with regard to FIG. 5.

Figure 6:
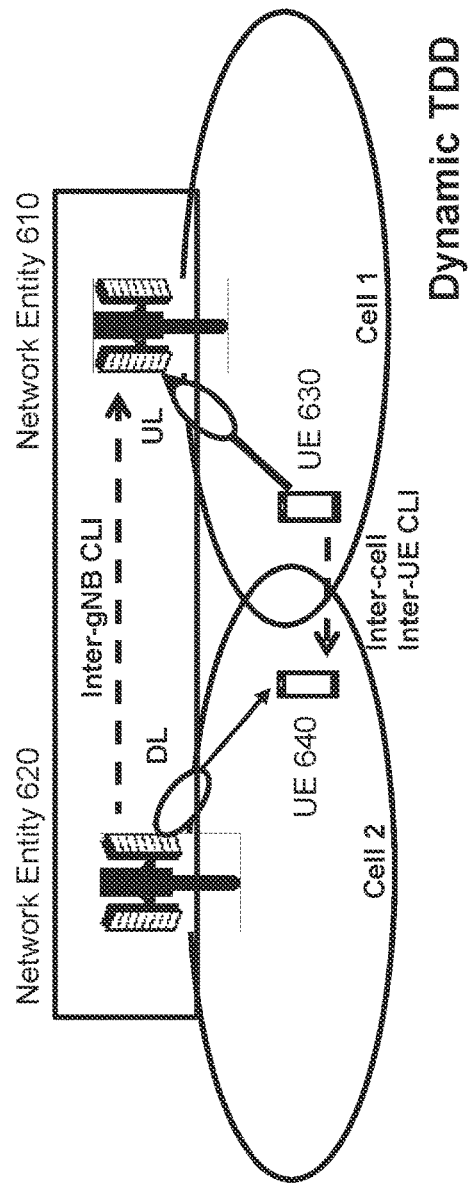
FIG. 6 is a diagram illustrating an example of inter-gNB cross-link interference (CLI), in accordance with the present disclosure.

FIG. 6 is a diagram illustrating an example 600 of inter-gNB CLI, in accordance with the present disclosure.

Example 600 shows that a first network entity 610 (e.g., gNB) may communicate with a first UE 630 in a first cell (Cell 1), and a second network entity 620 (e.g., gNB) may communicate with a second UE 640 in a second cell (Cell 2). The communications may involve dynamic TDD. CLI may include interference that is caused by different link directions on the same frequency band in the same cell or neighboring cells. For example, if network entity 610 is receiving a communication on an uplink (UL) from UE 630 in Cell 1 while network entity 620 is transmitting a communication on a downlink (DL) to UE 640 in Cell 2, network entity 610 may experience some inter-gNB CLI from network entity 620. The greater the transmit power used by network entity 620, the greater the CLI. Network entity 610 may be considered to be a victim gNB, and network entity 620 may be considered to be an aggressor gNB. UE 640 may also experience inter-cell inter-UE CLI from the transmission by UE 630.

As indicated above, FIG. 6 is provided as an example. Other examples may differ from what is described with regard to FIG. 6.

Figure 7:
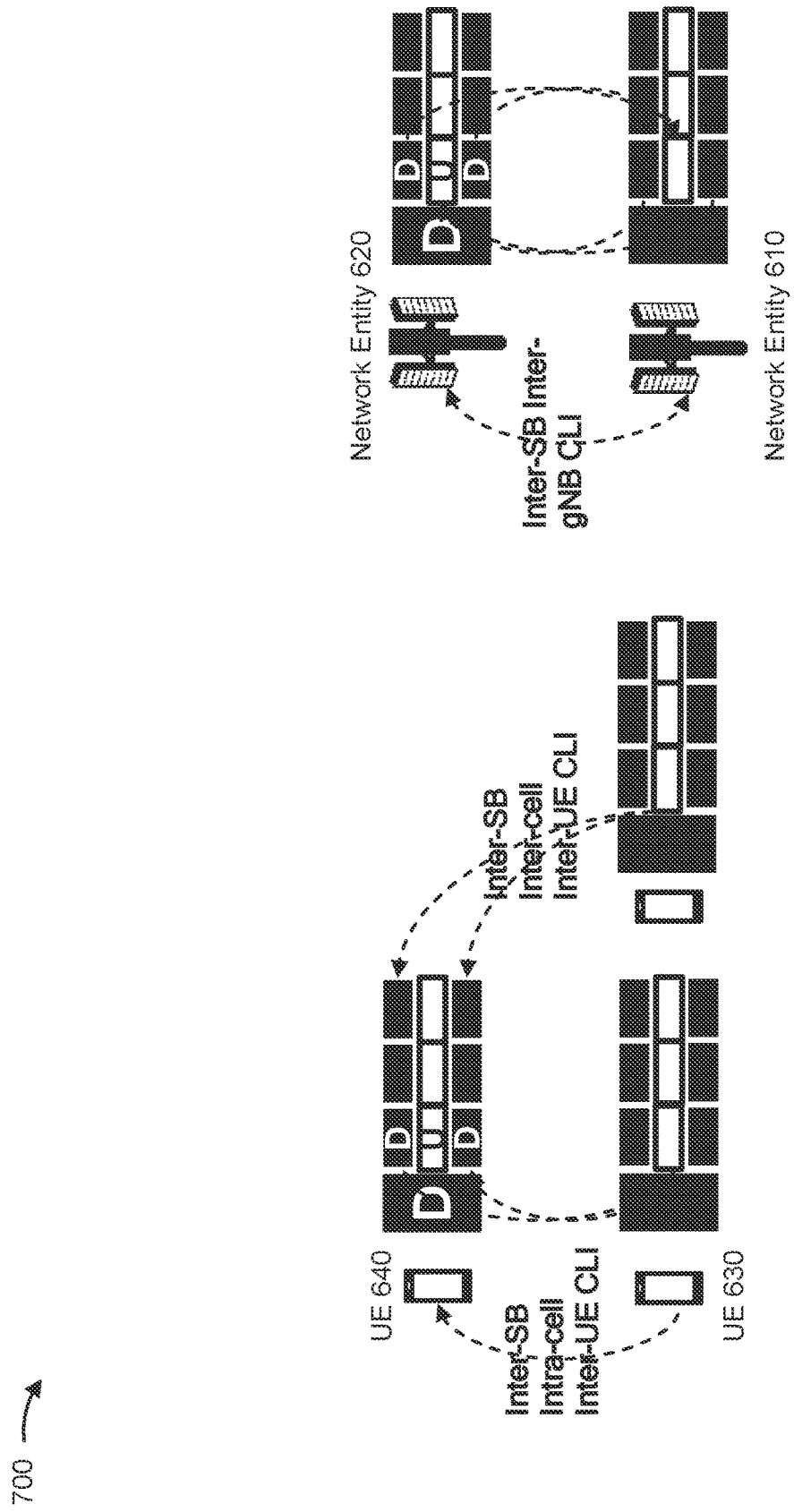
FIG. 7 is a diagram illustrating an example of inter-subband CLI, in accordance with the present disclosure.

FIG. 7 is a diagram illustrating an example 700 of inter-subband CLI, in accordance with the present disclosure.

UEs and network entities may experience inter-subband (inter-SB) CLI. As shown in example 700, in a TDD context, downlink subbands of UE 640 may experience CLI from the uplink subbands of UE 630. Downlink subbands of network entity 610 may experience CLI from uplink subbands of network entity 620. Uplink subbands of network entity 610 may experience CLI from downlink subbands of network entity 620.

As indicated above, FIG. 7 is provided as an example. Other examples may differ from what is described with regard to FIG. 7.

Figure 8:
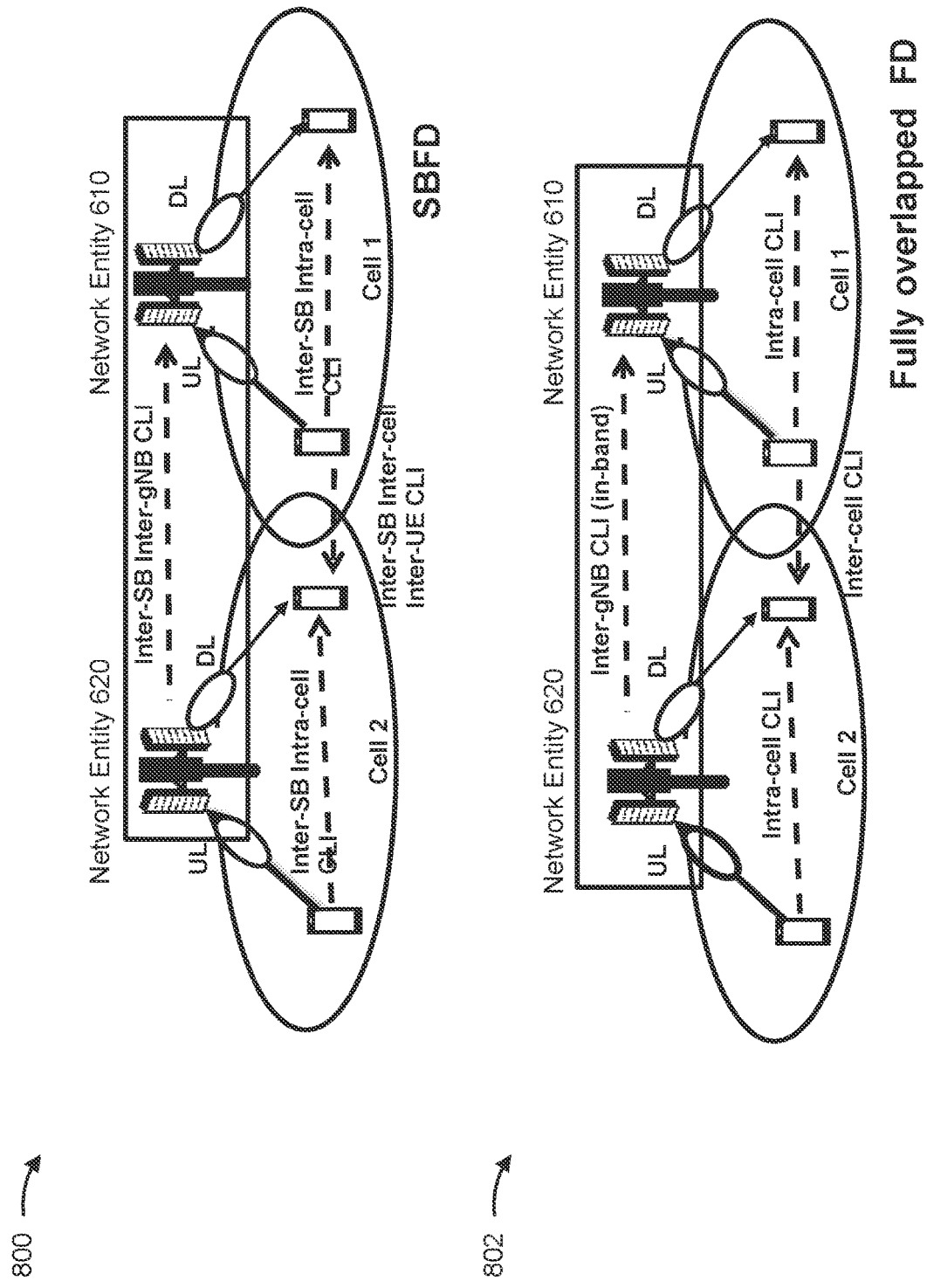
FIG. 8 is a diagram illustrating an example of CLI, in accordance with the present disclosure.

FIG. 8 is a diagram illustrating examples 800 and 802 of CLI, in accordance with the present disclosure.

Example 800 shows that inter-SB CLI may occur within cells (intra-cell) and across cells (inter-cell). Example 802 shows that CLI may occur within a band (in-band) or between subbands (inter-SB). CLI may occur between UEs and between network entities. CLI may degrade communications. Failed communications and retransmissions waste signaling resources and increase latency.

As indicated above, FIG. 8 is provided as an example. Other examples may differ from what is described with regard to FIG. 8.

Figure 9:
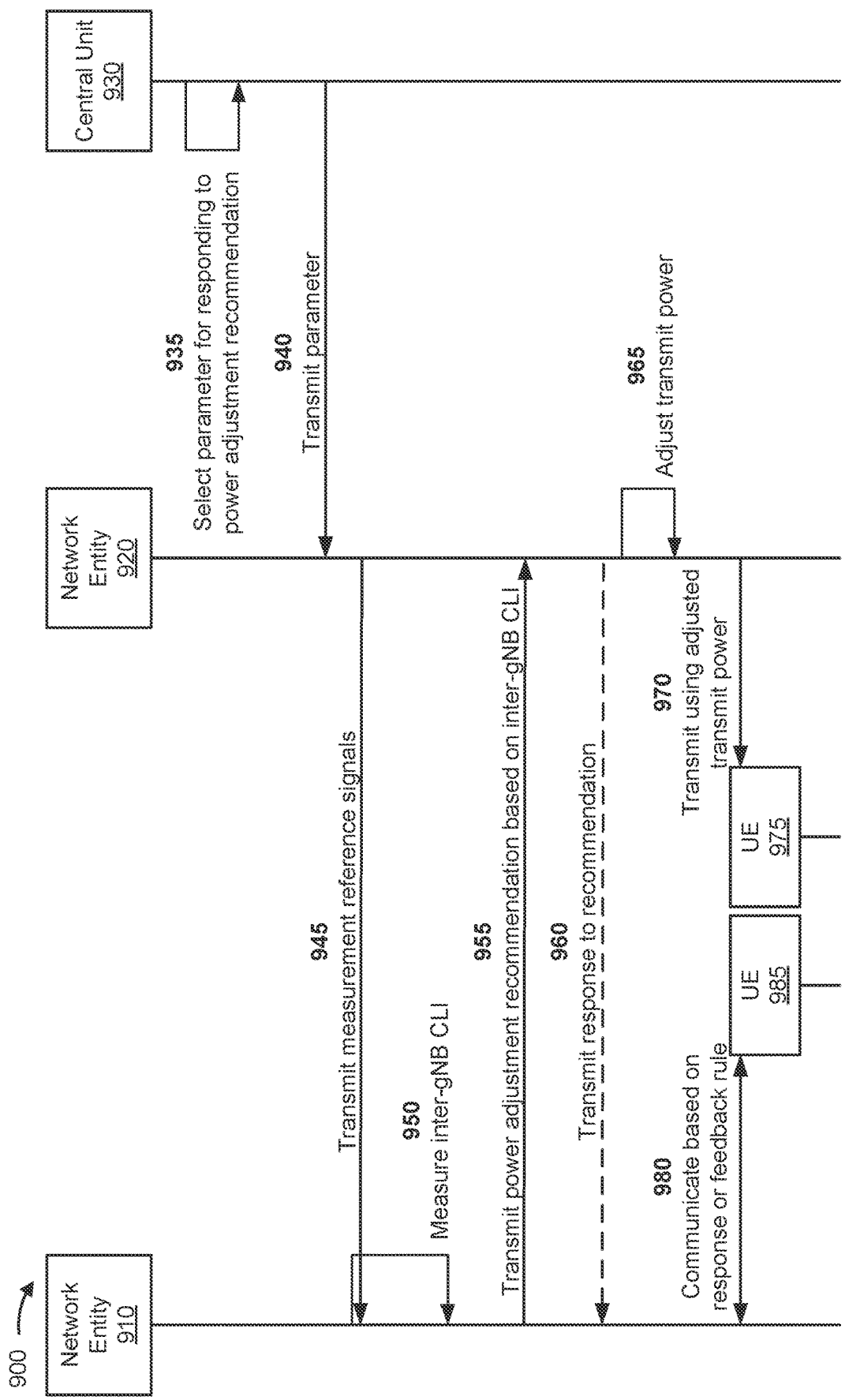
FIG. 9 is a diagram illustrating an example of recommending power adjustments, in accordance with the present disclosure.

FIG. 9 is a diagram illustrating an example 900 of recommending power adjustments, in accordance with the present disclosure. As shown in FIG. 9, a network entity 910 (e.g., network node 110) and a network entity 920 (e.g., network node 110) may communicate with one another via a wireless network (e.g., wireless network 100). Network entity 920 may communicate with a central unit 930 (e.g., network node 110, network controller 130).

According to various aspects described herein, a first network entity may measure CLI and provide a recommendation to a second network entity to adjust a transmit power. The recommendation may include a power backoff amount (e.g., 5 dB) or another indication of how much the transmit power is to be reduced. The first network entity may receive a response that the recommendation was accepted (e.g., ACK) or not accepted (e.g., NACK). The first network entity may communicate based at least in part on the response. For example, if the response is an ACK (e.g., confirmation message), the first network entity may communicate as normal without expecting as much CLI (since the second network entity is expected to reduce transmit power). If the response is a NACK (e.g., negative response), the first network entity may communicate differently. This may include making a scheduling change to not receive from a first UE when the second network entity is transmitting to a second UE in the direction of the first UE. In some aspects, the first network entity may communicate based at least in part on a feedback rule for when a response is not received. The default value may be an ACK or a NACK if no response is received. By communicating based at least in part on a response to, or a feedback rule for, a transmit power adjustment recommendation, the first network entity may mitigate or avoid CLI from the second network entity and improve communications. Improving communications conserves signaling resources and reduces latency.

In some aspects, the recommendations and responses for downlink transmit power adjustment are provided via an Xn interface, an F1AP interface, or over the air (OTA) between network entities. This may include signaling between CUs of different network entities, in contrast to communications between a DU and an MT of the same network entity. An MT is mandated to follow instructions from a CU, but one network entity CU may not be mandated to follow another network entity CU and thus can choose to follow a recommendation or to not follow a recommendation from the other network entity CU. Signaling between CUs of different network entities may also involve signaling between different operators. With signaling between a DU and an MT, the DU (or the CU for the DU) controls the communications for MTs and there is no reason for an aggressor DU or MT to listen for and respond to any power adjustment recommendations from a victim MT, and there is no reason for a victim MT to determine what action to take based on a response or no response.

Example 900 shows a network entity (network entity 910) that provides a transmit power adjustment recommendation to another network entity (network entity 920) and communicates based on a response or a feedback rule.

In some aspects, before the recommendation and response, the central unit 930 may provide parameters for recommendation and/or response. For example, the central unit 930 may select a parameter for network entity 920 responding to a transmit power adjustment recommendation from network entity 910, as shown by reference number 935. The parameter may include a response window in which network entity 920 is to transmit a response to a recommendation. The response is to be transmitted in the response window and not after the response window. This gives network entity 910 a chance to move forward with other actions or recommendations without waiting too long. As a result, latency is reduced. As shown by reference number 940, the central unit 930 may transmit the parameter to network entity 920. In some aspects, another parameter may indicate a time window in which the downlink transmit power adjustment is to be applied or frequency resources in which the downlink transmit power adjustment is to be applied.

As shown by reference number 945, network entity 920 may transmit measurement reference signals. The measurement reference signals may include non-zero power (NZP) channel state information (CSI) reference signals (CSI-RSs) and/or synchronization signal block reference signals (SSBRSs). Parameters from the central unit may include what signals to measure, a periodicity of the signals, a timing of the signals, and/or a frequency of the signals. The measurement reference signals may include reference signals that are specific to measuring inter-network-entity (e.g., inter-gNB) CLI. As shown by reference number 950, network entity 910 may measure the inter-gNB CLI.

As shown by reference number 955, network entity 910 may transmit a recommendation for downlink transmit power adjustment by network entity 920. The downlink transmit power adjustment may include a downlink transmit power adjustment value, such as a power backoff amount (e.g., 5 dB). In some aspects, the downlink transmit power adjustment may be for a specified beam of network entity 920. In some aspects, the downlink transmit power adjustment may be for a specified time window. The specified time window may be, for example, the next N slots, the next N symbols, or the next M milliseconds. In some aspects, the time window may stop until another request is received from network entity 910. That is, network entity 920 may apply the recommended transmit power adjustment (e.g., backoff) until network entity 920 receives another notification to stop applying the transmit power adjustment. In some aspects, the downlink transmit power adjustment may be for specified frequency resources (e.g., bandwidth, subband).

As shown by reference number 960, network entity 920 may transmit a response to the recommendation. In some aspects, the response may include an ACK that indicates acceptance of the recommendation. The ACK may be a confirmation message. The response may indicate a modification to the recommendation. In some aspects, the response may include a NACK that indicates rejection of the recommendation.

As shown by reference number 965, network entity 920 may adjust the downlink transmit power for communications based at least in part on the recommendation (acceptance of the recommendation). As shown by reference number 970, network entity 920 may transmit one or more communications to UE 975 with the adjusted transmit power (e.g., reduced transmit power). Alternatively, network entity 920 may not adjust the downlink transmit power (rejection of the recommendation).

In some aspects, the network entity 920 may be configured to adjust the transmit power within a time window and not outside of the time window. The time window may stop until another recommendation from network entity 910, where a new time window will start. Network entity 920 may adjust the transmit power for frequency resources that are specified by network entity 910 or the central unit 930. Network entity 920 may adjust the transmit power for a specified transmit beam.

As shown by reference number 980, network entity 910 may communicate with UE 985 based at least in part on the response. For example, if the response is an ACK, network entity 910 may communicate without a communication adjustment. If the response is a NACK, network entity 910 may adjust its communications. A communication adjustment may include a scheduling adjustment (e.g., different slot), a power adjustment (e.g., reduce transmit power to reduce possible responsive increases in power from network entity 920), and/or a beam adjustment (e.g., select a different receive beam direction). In some aspects, the NACK or an associated message may indicate that network entity 910 is to not transmit any further recommendations for a specified amount of time. This may be because network entity 920 is not able to back off the downlink transmit power during the specified amount of time.

In some aspects, the recommendation may include multiple downlink transmit power adjustment values that would be satisfactory for network entity 910. An adjustment value may include a delta from a current power. An adjustment value may include a recommend transmit power. Network entity 920 may select one of the values and indicate the selected value in the response. Network entity 920 may transmit a NACK if no value is accepted. In some aspects, network entity 910 may transmit further recommendations and receive further responses.

In some aspects, as also shown by reference number 980, network entity 910 may also communicate based at least in part on a feedback rule. The feedback rule may specify a default value to abide by if no response to the recommendation is received from network entity 920. For example, if the feedback rule specifies that an ACK is a default response, network entity 910 may not adjust its communications if no response is received (or received within a response time window). In another example, if the feedback rule specifies that a NACK is a default response, network entity 910 may adjust communications if no response is received (e.g., response window expires without a response, a response is received outside of the response window).

By using a CLI mitigation scheme that adjusts or does not adjust communications based on a response to a recommendation or a feedback rule, network entity 910 may avoid or mitigate CLI caused by another network entity. As a result, communications improve.

As indicated above, FIG. 9 is provided as an example. Other examples may differ from what is described with regard to FIG. 9.

Figure 10:
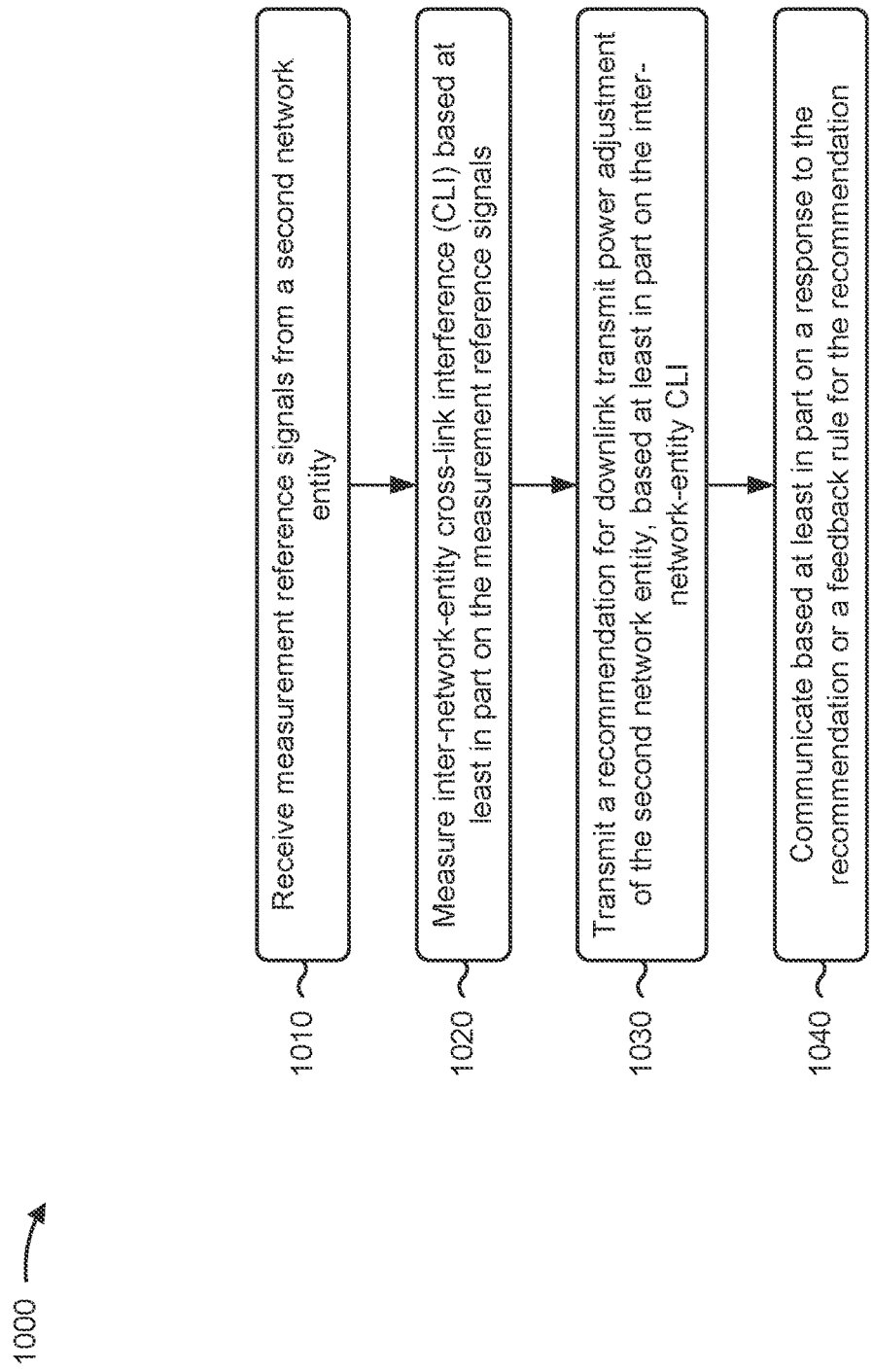
FIG. 10 is a diagram illustrating an example process performed, for example, by a first network entity, in accordance with the present disclosure.

FIG. 10 is a diagram illustrating an example process 1000 performed, for example, by a first network entity, in accordance with the present disclosure. Example process 1000 is an example where the first network entity (e.g., network node 110, first network entity 910) performs operations associated with communicating based on a response to power adjustment recommendation or a feedback rule.

As shown in FIG. 10, in some aspects, process 1000 may include receiving measurement reference signals from a second network entity (block 1010). For example, the first network entity (e.g., using communication manager 1306 and/or reception component 1302, depicted in FIG. 13) may receive measurement reference signals from a second network entity, as described above, for example, with reference to FIG. 9.

As further shown in FIG. 10, in some aspects, process 1000 may include measuring inter-network-entity CLI based at least in part on the measurement reference signals (block 1020). For example, the first network entity (e.g., using communication manager 1306, depicted in FIG. 13) may measure inter-network-entity CLI based at least in part on the measurement reference signals, as described above, for example, with reference to FIG. 9.

As further shown in FIG. 10, in some aspects, process 1000 may include transmitting a recommendation for downlink transmit power adjustment of the second network entity, based at least in part on the inter-network-entity CLI (block 1030). For example, the first network entity (e.g., using communication manager 1306 and/or transmission component 1304, depicted in FIG. 13) may transmit a recommendation for downlink transmit power adjustment of the second network entity, based at least in part on the inter-network-entity CLI, as described above, for example, with reference to FIG. 9.

As further shown in FIG. 10, in some aspects, process 1000 may include communicating based at least in part on a response to the recommendation or a feedback rule for the recommendation (block 1040). For example, the first network entity (e.g., using communication manager 1306, reception component 1302, and/or transmission component 1304, depicted in FIG. 13) may communicate based at least in part on a response to the recommendation or a feedback rule for the recommendation, as described above, for example, with reference to FIG. 9.

Process 1000 may include additional aspects, such as any single aspect or any combination of aspects described below and/or in connection with one or more other processes described elsewhere herein.

In a first aspect, the recommendation includes an amount of downlink transmit power backoff.

In a second aspect, alone or in combination with the first aspect, the downlink transmit power adjustment is for a specified transmit beam of the second network entity.

In a third aspect, alone or in combination with one or more of the first and second aspects, the downlink transmit power adjustment is associated with a time window in which the downlink transmit power adjustment is to be applied.

In a fourth aspect, alone or in combination with one or more of the first through third aspects, the time window includes a quantity of slots or symbols, or an amount of time that is associated with a specified subcarrier spacing.

In a fifth aspect, alone or in combination with one or more of the first through fourth aspects, the time window is to stop until another recommendation from the first network entity is received by the second network entity.

In a sixth aspect, alone or in combination with one or more of the first through fifth aspects, the downlink transmit power adjustment is associated with frequency resources in which the downlink transmit power adjustment is to be applied.

In a seventh aspect, alone or in combination with one or more of the first through sixth aspects, the recommendation includes multiple recommended downlink transmit power adjustment values including the downlink transmit power adjustment.

In an eighth aspect, alone or in combination with one or more of the first through seventh aspects, process 1000 includes receiving the response indicating one of the multiple downlink transmit power adjustment values.

In a ninth aspect, alone or in combination with one or more of the first through eighth aspects, the response is an ACK that indicates acceptance of the recommendation or a NACK that indicates rejection of the recommendation.

In a tenth aspect, alone or in combination with one or more of the first through ninth aspects, the NACK indicates that the first network entity is to refrain from transmitting further recommendations for a specified amount of time, and process 1000 includes refraining from transmitting further recommendations for the specified amount of time.

In an eleventh aspect, alone or in combination with one or more of the first through tenth aspects, the communicating includes scheduling uplink transmissions without a communication adjustment based at least in part on receiving an ACK.

In a twelfth aspect, alone or in combination with one or more of the first through eleventh aspects, the communicating includes scheduling uplink transmissions without a communication adjustment based at least in part on the feedback rule, and the feedback rule specifies that an ACK is a default response such that there is to be no adjustment to communications based at least in part on no response being received for the recommendation.

In a thirteenth aspect, alone or in combination with one or more of the first through twelfth aspects, the communicating includes scheduling uplink transmissions with a communication adjustment based at least in part on receiving a NACK.

In a fourteenth aspect, alone or in combination with one or more of the first through thirteenth aspects, the communication adjustment includes one or more of a scheduling adjustment, a power adjustment, or a beam adjustment.

In a fifteenth aspect, alone or in combination with one or more of the first through fourteenth aspects, the communicating includes scheduling uplink transmissions with an adjustment based at least in part on the feedback rule, and the feedback rule specifies that a NACK is a default response such that there is to be a communication adjustment to communications based at least in part on no response being received for the recommendation.

In a sixteenth aspect, alone or in combination with one or more of the first through fifteenth aspects, communicating based at least in part on the response or the feedback rule includes communicating based at least in part on the response being received in a response window.

In a seventeenth aspect, alone or in combination with one or more of the first through sixteenth aspects, the feedback rule specifies that no response received within the response window indicates a NACK indicating that the second network entity has rejected the recommendation.

In an eighteenth aspect, alone or in combination with one or more of the first through seventeenth aspects, the feedback rule specifies that no response received within the response window indicates an ACK indicating that the second network entity has accepted the recommendation.

In a nineteenth aspect, alone or in combination with one or more of the first through eighteenth aspects, process 1000 includes transmitting another recommendation associated with another response window based at least in part on the response being a NACK.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
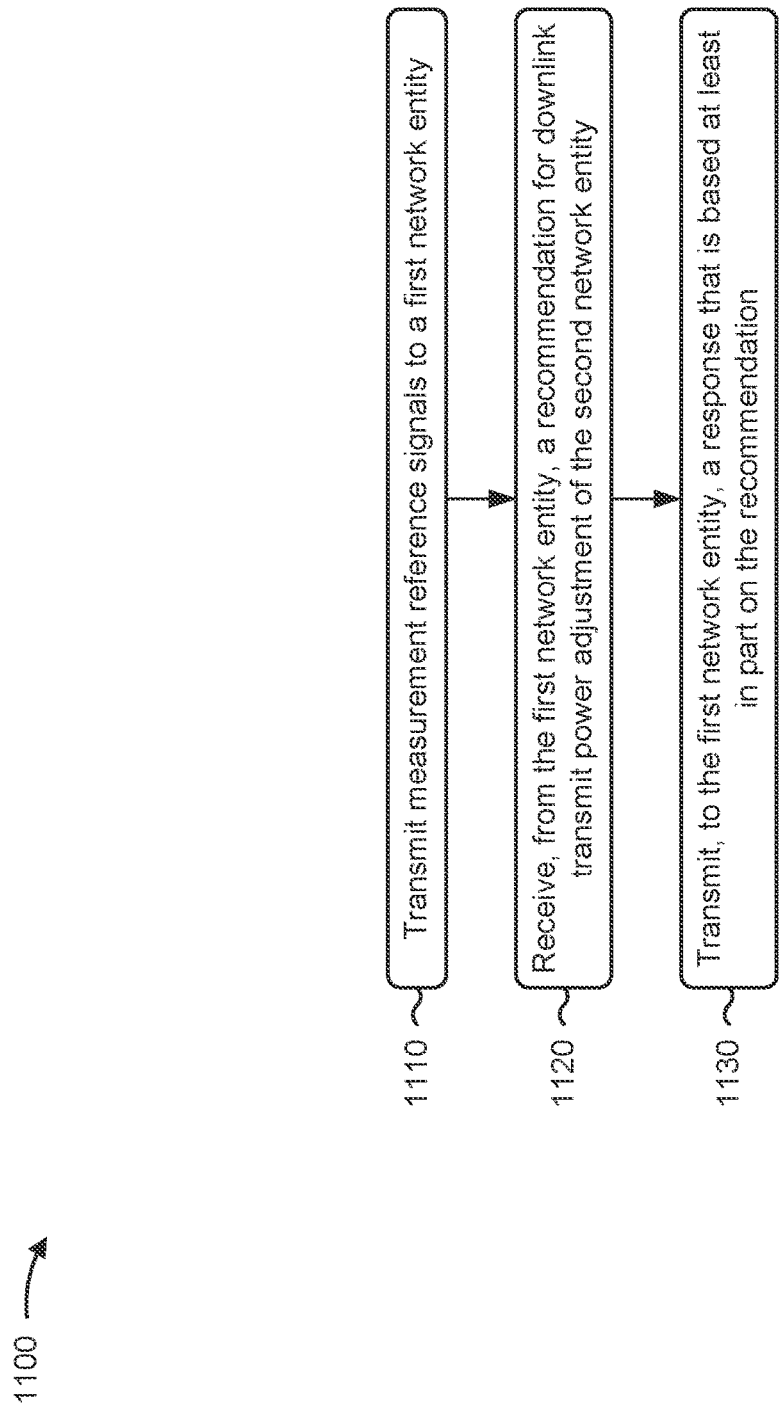
FIG. 11 is a diagram illustrating an example process performed, for example, by a second network entity, in accordance with the present disclosure.

FIG. 11 is a diagram illustrating an example process 1100 performed, for example, by a second network entity, in accordance with the present disclosure. Example process 1100 is an example where the second network entity (e.g., network node 110, second network entity 920) performs operations associated with providing a response to a power adjustment recommendation.

As shown in FIG. 11, in some aspects, process 1100 may include transmitting measurement reference signals to a first network entity (block 1110). For example, the second network entity (e.g., using communication manager 1306 and/or transmission component 1304, depicted in FIG. 13) may transmit measurement reference signals to a first network entity, as described above, for example, with reference to FIG. 9.

As further shown in FIG. 11, in some aspects, process 1100 may include receiving, from the first network entity, a recommendation for downlink transmit power adjustment of the second network entity (block 1120). For example, the second network entity (e.g., using communication manager 1306 and/or reception component 1302, depicted in FIG. 13) may receive, from the first network entity, a recommendation for downlink transmit power adjustment of the second network entity, as described above, for example, with reference to FIG. 9.

As further shown in FIG. 11, in some aspects, process 1100 may include transmitting, to the first network entity, a response that is based at least in part on the recommendation (block 1130). For example, the second network entity (e.g., using communication manager 1306 and/or transmission component 1304, depicted in FIG. 13) may transmit, to the first network entity, a response that is based at least in part on the recommendation, as described above, for example, with reference to FIG. 9.

Process 1100 may include additional aspects, such as any single aspect or any combination of aspects described below and/or in connection with one or more other processes described elsewhere herein.

In a first aspect, process 1100 includes adjusting downlink transmit power based at least in part on the recommendation.

In a second aspect, alone or in combination with the first aspect, adjusting the downlink transmit power includes adjusting the downlink transmit power within a time window in which the downlink transmit power adjustment is to be applied.

In a third aspect, alone or in combination with one or more of the first and second aspects, the time window includes a quantity of slots or symbols, or an amount of time that is associated with a specified subcarrier spacing.

In a fourth aspect, alone or in combination with one or more of the first through third aspects, the time window is to stop until another recommendation from the first network entity is received by the second network entity.

In a fifth aspect, alone or in combination with one or more of the first through fourth aspects, adjusting the downlink transmit power includes adjusting the downlink transmit power for specified frequency resources.

In a sixth aspect, alone or in combination with one or more of the first through fifth aspects, the recommendation includes an amount of downlink transmit power backoff.

In a seventh aspect, alone or in combination with one or more of the first through sixth aspects, the downlink transmit power adjustment is for a specified transmit beam of the second network entity.

In an eighth aspect, alone or in combination with one or more of the first through seventh aspects, transmitting the response includes transmitting the response within a response window.

In a ninth aspect, alone or in combination with one or more of the first through eighth aspects, the recommendation includes multiple recommended downlink transmit power adjustment values including the downlink transmit power adjustment, and process 1100 includes selecting a recommended downlink transmit power adjustment value from the multiple recommended downlink transmit power adjustment values to indicate in the response.

In a tenth aspect, alone or in combination with one or more of the first through ninth aspects, the response is an ACK that indicates acceptance of the recommendation or a NACK that indicates rejection of the recommendation.

In an eleventh aspect, alone or in combination with one or more of the first through tenth aspects, the NACK indicates that the first network entity is to refrain from transmitting further recommendations for a specified amount of time.

In a twelfth aspect, alone or in combination with one or more of the first through eleventh aspects, the feedback rule specifies that an ACK is a default response such that there is to be no adjustment to communications based at least in part on no response being received for the recommendation.

In a thirteenth aspect, alone or in combination with one or more of the first through twelfth aspects, the feedback rule specifies that a NACK is a default response such that there is to be a communication adjustment to communications based at least in part on no response being received for the recommendation.

In a fourteenth aspect, alone or in combination with one or more of the first through thirteenth aspects, the feedback rule specifies that no response received within a response window indicates a NACK indicating that the second network entity has rejected the recommendation.

In a fifteenth aspect, alone or in combination with one or more of the first through fourteenth aspects, the feedback rule specifies that no response received within the response window indicates an ACK indicating that the second network entity has accepted the recommendation.

In a sixteenth aspect, alone or in combination with one or more of the first through fifteenth aspects, process 1100 includes transmitting another recommendation associated with another response window based at least in part on the response being a NACK.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
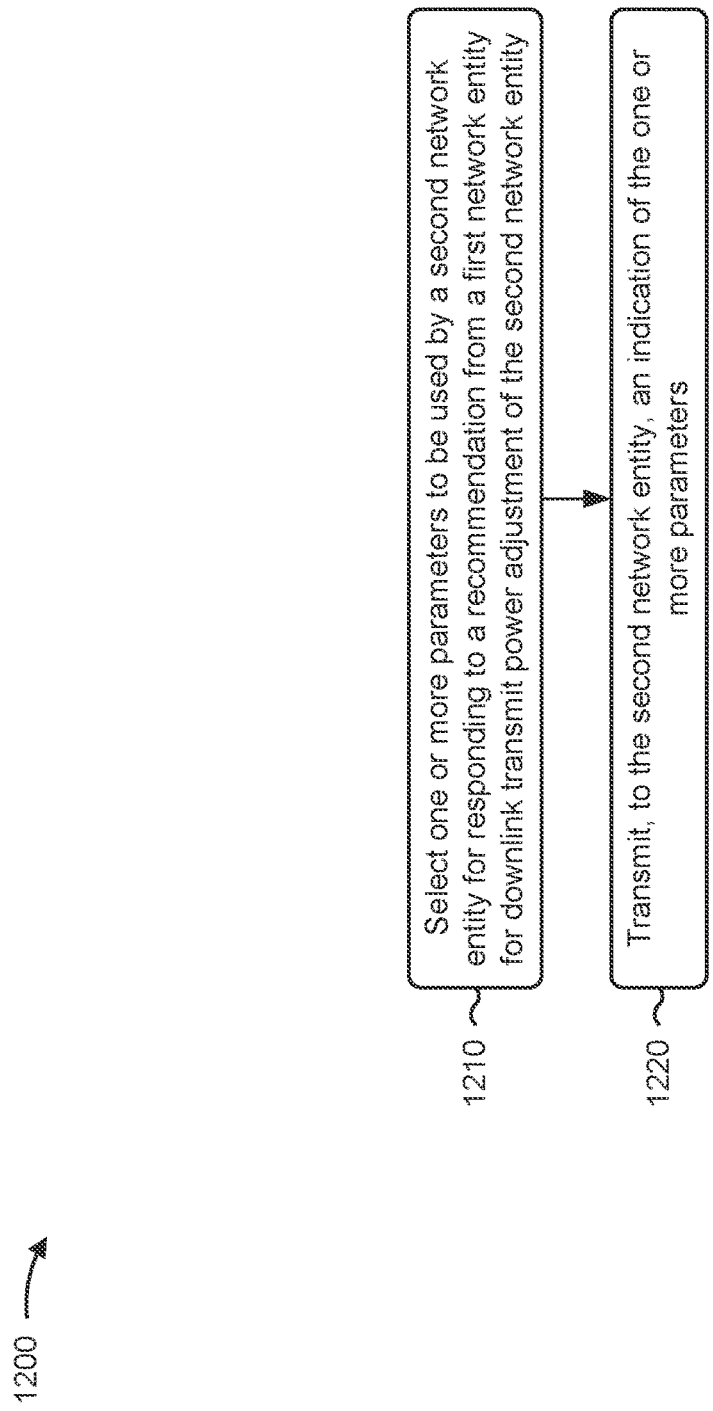
FIG. 12 is a diagram illustrating an example process performed, for example, by a third network entity, in accordance with the present disclosure.

FIG. 12 is a diagram illustrating an example process 1200 performed, for example, by a third network entity, in accordance with the present disclosure. Example process 1200 is an example where the third network entity (e.g., network node 110, network controller 130, central unit 930) performs operations associated with indicating parameters for responding to a power adjustment recommendation.

As shown in FIG. 12, in some aspects, process 1200 may include selecting one or more parameters to be used by a second network entity for responding to a recommendation from a first network entity for downlink transmit power adjustment of the second network entity (block 1210). For example, the third network entity (e.g., using communication manager 1406, depicted in FIG. 14) may select one or more parameters to be used by a second network entity for responding to a recommendation from a first network entity for downlink transmit power adjustment of the second network entity, as described above, for example, with reference to FIG. 9.

As further shown in FIG. 12, in some aspects, process 1200 may include transmitting, to the second network entity, an indication of the one or more parameters (block 1220). For example, the third network entity (e.g., using communication manager 1406 and/or transmission component 1404, depicted in FIG. 14) may transmit, to the second network entity, an indication of the one or more parameters, as described above, for example, with reference to FIG. 9.

Process 1200 may include additional aspects, such as any single aspect or any combination of aspects described below and/or in connection with one or more other processes described elsewhere herein.

In a first aspect, the one or more parameters include a response window in which the second network entity is to transmit a response to the recommendation.

In a second aspect, alone or in combination with the first aspect, the one or more parameters include one or more of a time window in which the downlink transmit power adjustment is to be applied or frequency resources in which the downlink transmit power adjustment is to be applied.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
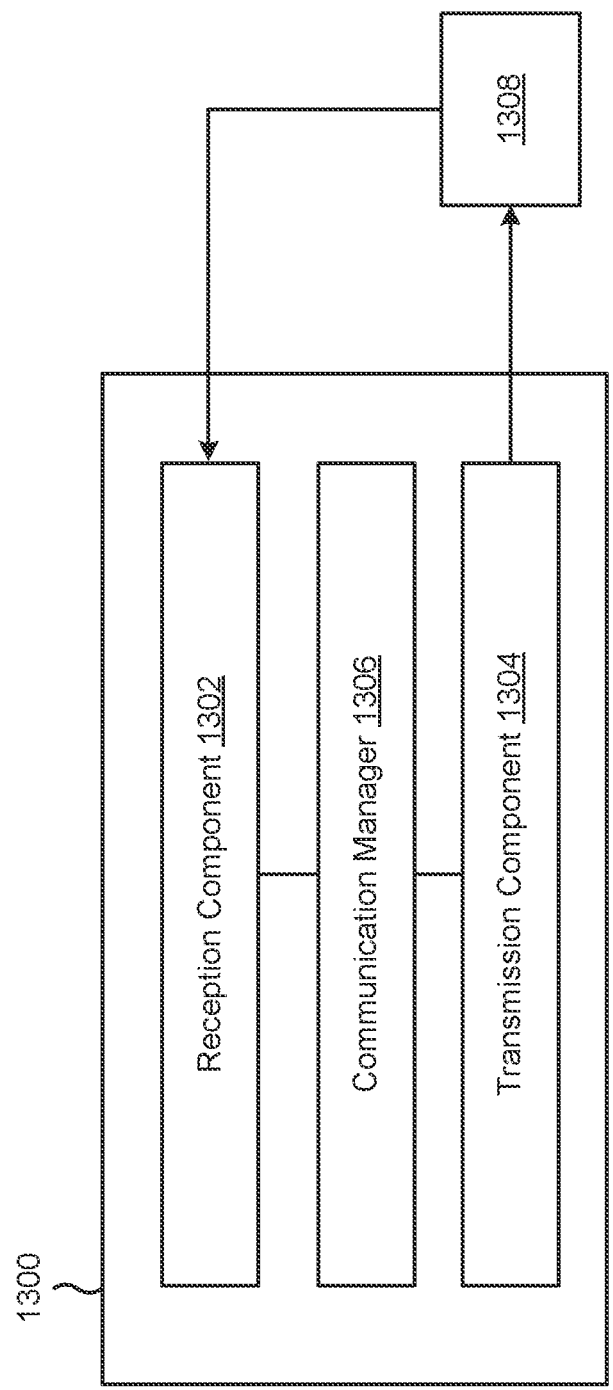
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a network entity, or a network entity may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 140 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 1-9. Additionally, or alternatively, the apparatus 1300 may be configured to perform one or more processes described herein, such as process 1000 of FIG. 10, process 1100 of FIG. 11, or a combination thereof. In some aspects, the apparatus 1300 and/or one or more components shown in FIG. 13 may include one or more components of the network entity described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network entity described in connection with FIG. 2.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, a modem, a modulator, a transmit MIMO processor, a transmit processor, a controller/processor, a memory, or a combination thereof, of the network entity described in connection with FIG. 2. In some aspects, the transmission component 1304 may be co-located with the reception component 1302 in a transceiver.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

In some aspects associated with a first network entity that is a victim network entity (e.g., victim gNB), the reception component 1302 may receive measurement reference signals from a second network entity. The communication manager 1306 may measure inter-network-entity CLI based at least in part on the measurement reference signals. The transmission component 1304 may transmit a recommendation for downlink transmit power adjustment of the second network entity, based at least in part on the CLI. The reception component 1302 and/or the transmission component 1304 may communicate based at least in part on a response to the recommendation or a feedback rule for the recommendation.

The reception component 1302 may receive the response indicating one of the multiple downlink transmit power adjustment values. The transmission component 1304 may transmit another recommendation associated with another response window based at least in part on the response being a NACK.

In some aspects associated with a second network entity that is an aggressor network entity (e.g., aggressor gNB), the transmission component 1304 may transmit measurement reference signals to a first network entity. The reception component 1302 may receive, from the first network entity, a recommendation for downlink transmit power adjustment of the second network entity. The transmission component 1304 may transmit, to the first network entity, a response that is based at least in part on the recommendation.

The communication manager 1306 may adjust downlink transmit power based at least in part on the recommendation. The transmission component 1304 may transmit another recommendation associated with another response window based at least in part on the response being a NACK.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
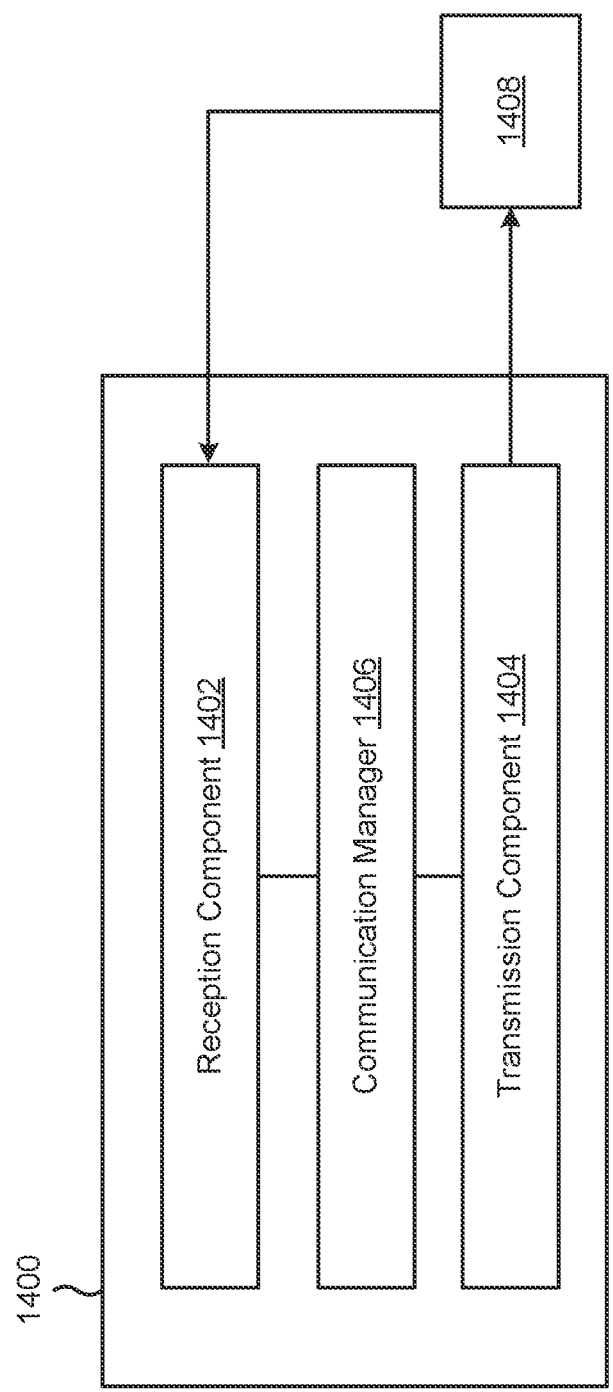
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a network entity or network controller, or a network entity or network controller may include the apparatus 1400. In some aspects, the apparatus 1400 includes a reception component 1402, a transmission component 1404, and/or a communication manager 1406, which may be in communication with one another (for example, via one or more buses and/or one or more other components). In some aspects, the communication manager 1406 is the communication manager 150 described in connection with FIG. 1. As shown, the apparatus 1400 may communicate with another apparatus 1408, such as a UE or a network node (such as a CU, a DU, an RU, or a base station), using the reception component 1402 and the transmission component 1404.

In some aspects, the apparatus 1400 may be configured to perform one or more operations described herein in connection with FIGS. 1-9. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the network entity described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1408. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network entity described in connection with FIG. 2.

The transmission component 1404 may transmit communications, such as reference signals, control information, data communications, or a combination thereof, to the apparatus 1408. In some aspects, one or more other components of the apparatus 1400 may generate communications and may provide the generated communications to the transmission component 1404 for transmission to the apparatus 1408. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1404 may include one or more antennas, a modem, a modulator, a transmit MIMO processor, a transmit processor, a controller/processor, a memory, or a combination thereof, of the network entity described in connection with FIG. 2. In some aspects, the transmission component 1404 may be co-located with the reception component 1402 in a transceiver.

The communication manager 1406 may support operations of the reception component 1402 and/or the transmission component 1404. For example, the communication manager 1406 may receive information associated with configuring reception of communications by the reception component 1402 and/or transmission of communications by the transmission component 1404. Additionally, or alternatively, the communication manager 1406 may generate and/or provide control information to the reception component 1402 and/or the transmission component 1404 to control reception and/or transmission of communications.

In some aspects associated with a third network entity that is a central unit, the communication manager 1306 may select one or more parameters to be used by a second network entity for responding to a recommendation from a first network entity for downlink transmit power adjustment of the second network entity. The transmission component 1304 may transmit, to the second network entity, an indication of the one or more parameters.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a first network entity, comprising: receiving measurement reference signals from a second network entity; measuring inter-network-entity cross-link interference (CLI) based at least in part on the measurement reference signals; transmitting a recommendation for downlink transmit power adjustment of the second network entity, based at least in part on the inter-network-entity CLI; and communicating based at least in part on a response to the recommendation or a feedback rule for the recommendation.

Aspect 2: The method of Aspect 1, wherein the recommendation includes an amount of downlink transmit power backoff.

Aspect 3: The method of any of Aspects 1-2, wherein the downlink transmit power adjustment is for a specified transmit beam of the second network entity.

Aspect 4: The method of any of Aspects 1-3, wherein the downlink transmit power adjustment is associated with a time window in which the downlink transmit power adjustment is to be applied.

Aspect 5: The method of Aspect 4, wherein the time window includes a quantity of slots or symbols, or an amount of time that is associated with a specified subcarrier spacing.

Aspect 6: The method of Aspect 4, wherein the time window is to stop until another recommendation from the first network entity is received by the second network entity.

Aspect 7: The method of any of Aspects 1-6, wherein the downlink transmit power adjustment is associated with frequency resources in which the downlink transmit power adjustment is to be applied.

Aspect 8: The method of any of Aspects 1-7, wherein the recommendation includes multiple recommended downlink transmit power adjustment values including the downlink transmit power adjustment.

Aspect 9: The method of Aspect 8, further comprising receiving the response indicating one of the multiple recommended downlink transmit power adjustment values.

Aspect 10: The method of any of Aspects 1-9, wherein the response is an acknowledgement (ACK) that indicates acceptance of the recommendation or a negative acknowledgement (NACK) that indicates rejection of the recommendation.

Aspect 11: The method of Aspect 10, wherein the NACK indicates that the first network entity is to refrain from transmitting further recommendations for a specified amount of time, and wherein the method includes refraining from transmitting further recommendations for the specified amount of time.

Aspect 12: The method of any of Aspects 1-10, wherein the communicating includes scheduling uplink transmissions without a communication adjustment based at least in part on receiving an acknowledgement.

Aspect 13: The method of any of Aspects 1-7, wherein the communicating includes scheduling uplink transmissions without a communication adjustment based at least in part on the feedback rule, and wherein the feedback rule specifies that an acknowledgement is a default response such that there is to be no adjustment to communications based at least in part on no response being received for the recommendation.

Aspect 14: The method of any of Aspects 1-7, wherein the communicating includes scheduling uplink transmissions with a communication adjustment based at least in part on receiving a negative acknowledgement.

Aspect 15: The method of Aspect 14, wherein the communication adjustment includes one or more of a scheduling adjustment, a power adjustment, or a beam adjustment.

Aspect 16: The method of any of Aspects 1-7, wherein the communicating includes scheduling uplink transmissions with an adjustment based at least in part on the feedback rule, and wherein the feedback rule specifies that a negative acknowledgement is a default response such that there is to be a communication adjustment to communications based at least in part on no response being received for the recommendation.

Aspect 17: The method of any of Aspects 1-7, wherein communicating based at least in part on the response or the feedback rule includes communicating based at least in part on the response being received in a response window.

Aspect 18: The method of Aspect 17, wherein the feedback rule specifies that no response received within the response window indicates a negative acknowledgement indicating that the second network entity has rejected the recommendation.

Aspect 19: The method of Aspect 17, wherein the feedback rule specifies that no response received within the response window indicates an acknowledgement indicating that the second network entity has accepted the recommendation.

Aspect 20: The method of any of Aspects 1-19, further comprising transmitting another recommendation associated with another response window based at least in part on the response being a negative acknowledgement.

Aspect 21: A method of wireless communication performed by a second network entity, comprising: transmitting measurement reference signals to a first network entity; receiving, from the first network entity, a recommendation for downlink transmit power adjustment of the second network entity; and transmitting, to the first network entity, a response that is based at least in part on the recommendation.

Aspect 22: The method of Aspect 21, further comprising adjusting downlink transmit power based at least in part on the recommendation.

Aspect 23: The method of Aspect 22, wherein adjusting the downlink transmit power includes adjusting the downlink transmit power within a time window in which the downlink transmit power adjustment is to be applied.

Aspect 24: The method of Aspect 23, wherein the time window includes a quantity of slots or symbols, or an amount of time that is associated with a specified subcarrier spacing.

Aspect 25: The method of Aspect 23, wherein the time window is to stop until another recommendation from the first network entity is received by the second network entity.

Aspect 26: The method of Aspect 22, wherein adjusting the downlink transmit power includes adjusting the downlink transmit power for specified frequency resources.

Aspect 27: The method of any of Aspects 21-26, wherein the recommendation includes an amount of downlink transmit power backoff.

Aspect 28: The method of any of Aspects 21-27, wherein the downlink transmit power adjustment is for a specified transmit beam of the second network entity.

Aspect 29: The method of any of Aspects 21-28, wherein transmitting the response includes transmitting the response within a response window.

Aspect 30: The method of any of Aspects 21-29, wherein the recommendation includes multiple recommended downlink transmit power adjustment values including the downlink transmit power adjustment, and wherein the method includes selecting a recommended downlink transmit power adjustment value from the multiple recommended downlink transmit power adjustment values to indicate in the response.

Aspect 31: The method of any of Aspects 21-30, wherein the response is an acknowledgement (ACK) that indicates acceptance of the recommendation or a negative acknowledgement (NACK) that indicates rejection of the recommendation.

Aspect 32: The method of Aspect 31, wherein the NACK indicates that the first network entity is to refrain from transmitting further recommendations for a specified amount of time.

Aspect 33: The method of any of Aspects 21-30, wherein the feedback rule specifies that an acknowledgement is a default response such that there is to be no adjustment to communications based at least in part on no response being received for the recommendation.

Aspect 34: The method of any of Aspects 21-30, wherein the feedback rule specifies that a negative acknowledgement is a default response such that there is to be a communication adjustment to communications based at least in part on no response being received for the recommendation.

Aspect 35: The method of any of Aspects 21-30, wherein the feedback rule specifies that no response received within a response window indicates a negative acknowledgement indicating that the second network entity has rejected the recommendation.

Aspect 36: The method of any of Aspects 21-30, wherein the feedback rule specifies that no response received within the response window indicates an acknowledgement indicating that the second network entity has accepted the recommendation.

Aspect 37: The method of any of Aspects 21-30, further comprising transmitting another recommendation associated with another response window based at least in part on the response being a negative acknowledgement.

Aspect 38: A method of wireless communication performed by a third network entity, comprising: selecting one or more parameters to be used by a second network entity for responding to a recommendation from a first network entity for downlink transmit power adjustment of the second network entity; and transmitting, to the second network entity, an indication of the one or more parameters.

Aspect 39: The method of Aspect 38, wherein the one or more parameters include a response window in which the second network entity is to transmit a response to the recommendation.

Aspect 40: The method of any of Aspects 38-39, wherein the one or more parameters include one or more of a time window in which the downlink transmit power adjustment is to be applied or frequency resources in which the downlink transmit power adjustment is to be applied.

Aspect 41: An apparatus for wireless communication at a device, comprising a processor; memory coupled with the processor; and instructions stored in the memory and executable by the processor to cause the apparatus to perform the method of one or more of Aspects 1-40.

Aspect 42: A device for wireless communication, comprising a memory and one or more processors coupled to the memory, the one or more processors configured to perform the method of one or more of Aspects 1-40.

Aspect 43: An apparatus for wireless communication, comprising at least one means for performing the method of one or more of Aspects 1-40.

Aspect 44: A non-transitory computer-readable medium storing code for wireless communication, the code comprising instructions executable by a processor to perform the method of one or more of Aspects 1-40.

Aspect 45: A non-transitory computer-readable medium storing a set of instructions for wireless communication, the set of instructions comprising one or more instructions that, when executed by one or more processors of a device, cause the device to perform the method of one or more of Aspects 1-40.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first network entity for wireless communication, comprising:
   one or more memories; and
   one or more processors, coupled to the one or more memories, individually or collectively configured to cause the first network entity to:
   receive measurement reference signals from a second network entity;
   measure inter-network-entity cross-link interference (CLI) based at least in part on the measurement reference signals;
   transmit a recommendation for downlink transmit power adjustment of the second network entity, based at least in part on the inter-network-entity CLI; and
   communicate based at least in part on a response to the recommendation or a feedback rule for the recommendation.

2. The first network entity of claim 1, wherein the recommendation includes an amount of downlink transmit power backoff.

3. The first network entity of claim 1, wherein the downlink transmit power adjustment is for a specified transmit beam of the second network entity.

4. The first network entity of claim 1, wherein the downlink transmit power adjustment is associated with a time window in which the downlink transmit power adjustment is to be applied.

5. The first network entity of claim 1, wherein the downlink transmit power adjustment is associated with frequency resources in which the downlink transmit power adjustment is to be applied.

6. The first network entity of claim 1, wherein the recommendation includes multiple recommended downlink transmit power adjustment values including the downlink transmit power adjustment.

7. The first network entity of claim 6, wherein the one or more processors are individually or collectively configured to cause the first network entity to receive the response indicating one of the multiple recommended downlink transmit power adjustment values.

8. The first network entity of claim 1, wherein the response is an acknowledgement (ACK) that indicates acceptance of the recommendation or a negative acknowledgement (NACK) that indicates rejection of the recommendation.

9. The first network entity of claim 8, wherein the NACK indicates that the first network entity is to refrain from transmitting further recommendations for a specified amount of time, and wherein the one or more processors are individually or collectively configured to refrain from transmitting further recommendations for the specified amount of time.

10. The first network entity of claim 1, wherein the one or more processors are individually or collectively configured to schedule uplink transmissions without a communication adjustment based at least in part on receiving an acknowledgement.

11. The first network entity of claim 1, wherein the one or more processors are individually or collectively configured to schedule uplink transmissions without a communication adjustment based at least in part on the feedback rule, and wherein the feedback rule specifies that an acknowledgement is a default response such that there is to be no adjustment to communications based at least in part on no response being received for the recommendation.

12. The first network entity of claim 1, wherein the one or more processors are individually or collectively configured to schedule uplink transmissions with a communication adjustment based at least in part on receiving a negative acknowledgement.

13. The first network entity of claim 12, wherein the communication adjustment includes one or more of a scheduling adjustment, a power adjustment, or a beam adjustment.

14. The first network entity of claim 1, wherein the one or more processors are individually or collectively configured to schedule uplink transmissions with an adjustment based at least in part on the feedback rule, and wherein the feedback rule specifies that a negative acknowledgement is a default response such that there is to be a communication adjustment to communications based at least in part on no response being received for the recommendation.

15. The first network entity of claim 1, wherein the one or more processors, to communicate based at least in part on the response or the feedback rule, are individually or collectively configured to cause the first network entity to communicate based at least in part on the response being received in a response window.

16. The first network entity of claim 15, wherein the feedback rule specifies that no response received within the response window indicates a negative acknowledgement indicating that the second network entity has rejected the recommendation.

17. The first network entity of claim 15, wherein the feedback rule specifies that no response received within the response window indicates an acknowledgement indicating that the second network entity has accepted the recommendation.

18. The first network entity of claim 1, wherein the one or more processors are individually or collectively configured to cause the first network entity to transmit another recommendation associated with another response window based at least in part on the response being a negative acknowledgement indicating that the second network entity has rejected the recommendation.

19. A second network entity for wireless communication, comprising:
one or more memories; and
one or more processors, coupled to the one or more memories, individually or collectively configured to cause the second network entity to:
transmit measurement reference signals to a first network entity;
receive, from the first network entity, a recommendation for downlink transmit power adjustment of the second network entity; and
transmit, to the first network entity, a response that is based at least in part on the recommendation.

20. The second network entity of claim 19, wherein the one or more processors are individually or collectively configured to cause the second network entity to adjust downlink transmit power based at least in part on the recommendation.

21. The second network entity of claim 20, wherein the one or more processors, to adjust the downlink transmit power, are individually or collectively configured to cause the second network entity to adjust the downlink transmit power within a time window in which the downlink transmit power adjustment is to be applied.

22. The second network entity of claim 21, wherein the time window includes a quantity of slots or symbols, or an amount of time that is associated with a specified subcarrier spacing.

23. The second network entity of claim 21, wherein the time window is to stop until another recommendation from the first network entity is received by the second network entity.

24. The second network entity of claim 20, wherein the one or more processors, to adjust the downlink transmit power, are individually or collectively configured to cause the second network entity to adjust the downlink transmit power for specified frequency resources.

25. The second network entity of claim 19, wherein the downlink transmit power adjustment is for a specified transmit beam of the second network entity.

26. The second network entity of claim 19, wherein the one or more processors, to transmit the response, are individually or collectively configured to cause the second network entity to transmit the response within a response window.

27. The second network entity of claim 19, wherein the recommendation includes multiple recommended downlink transmit power adjustment values including the downlink transmit power adjustment, and wherein the one or more processors are individually or collectively configured to select a recommended downlink transmit power adjustment value from the multiple recommended downlink transmit power adjustment values to indicate in the response.

28. The second network entity of claim 19, wherein the response is an acknowledgement (ACK) that indicates acceptance of the recommendation or a negative acknowledgement (NACK) that indicates rejection of the recommendation.

29. A method of wireless communication performed by a first network entity, comprising:
receiving measurement reference signals from a second network entity;
measuring inter-network-entity cross-link interference (CLI) based at least in part on the measurement reference signals;
transmitting a recommendation for downlink transmit power adjustment of the second network entity, based at least in part on the inter-network-entity CLI; and
communicating based at least in part on a response to the recommendation or a feedback rule for the recommendation.

30. The method of claim 29, wherein the communicating includes scheduling uplink transmissions without a communication adjustment based at least in part on the feedback rule, and wherein the feedback rule specifies that an acknowledgement is a default response such that there is to be no adjustment to communications based at least in part on no response being received for the recommendation.

31. The method of claim 29, wherein the communicating includes scheduling uplink transmissions with an adjustment based at least in part on the feedback rule, and wherein the feedback rule specifies that a negative acknowledgement is a default response such that there is to be a communication adjustment to communications based at least in part on no response being received for the recommendation.

32. A method of wireless communication performed by a second network entity, comprising:

transmitting measurement reference signals to a first network entity;

receiving, from the first network entity, a recommendation for downlink transmit power adjustment of the second network entity; and transmitting, to the first network entity, a response that is based at least in part on the recommendation.

33. A method of wireless communication performed by a third network entity, comprising:

selecting one or more parameters to be used by a second network entity for responding to a recommendation from a first network entity for downlink transmit power adjustment of the second network entity; and transmitting, to the second network entity, an indication of the one or more parameters.

34. The method of claim 33, wherein the one or more parameters include a response window in which the second network entity is to transmit a response to the recommendation.

35. The method of claim 33, wherein the one or more parameters include one or more of a time window in which the downlink transmit power adjustment is to be applied or frequency resources in which the downlink transmit power adjustment is to be applied.

* * * * *